(12) United States Patent
Hyun et al.

(10) Patent No.: US 9,886,743 B2
(45) Date of Patent: Feb. 6, 2018

(54) METHOD FOR INPUTTING DATA AND AN ELECTRONIC DEVICE THEREOF

(71) Applicant: Samsung Electronics Co., Ltd., Gyeonggi-do (KR)

(72) Inventors: Eun-Jung Hyun, Seoul (KR); Jeong-Min Park, Gyeonggi-do (KR); Kyung-Tae Kim, Gyeonggi-do (KR); Seung-Eun Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/642,117

(22) Filed: Mar. 9, 2015

(65) Prior Publication Data
US 2015/0253889 A1     Sep. 10, 2015

(30) Foreign Application Priority Data
Mar. 7, 2014 (KR) .................. 10-2014-0027114

(51) Int. Cl.
| | | |
|---|---|---|
| *G06T 3/60* | (2006.01) | |
| *G06F 3/0484* | (2013.01) | |
| *G06F 3/0488* | (2013.01) | |
| *G06F 3/0483* | (2013.01) | |

(52) U.S. Cl.
CPC ............ *G06T 3/60* (2013.01); *G06F 3/04845* (2013.01); *G06F 3/04883* (2013.01); *G06F 3/0483* (2013.01); *G06F 2203/04104* (2013.01); *G06F 2203/04806* (2013.01); *G06F 2203/04808* (2013.01)

(58) Field of Classification Search
CPC .... G06F 3/048; G06F 3/0481; G06F 3/04812; G06F 3/0482; G06F 3/0483; G06F 3/0484; G06F 3/04845; G06F 3/04847–3/04855; G06F 3/0487–3/04883; G06T 3/60–3/608
See application file for complete search history.

(56) References Cited

U.S. PATENT DOCUMENTS

| | | | | |
|---|---|---|---|---|
| 6,256,009 | B1 * | 7/2001 | Lui .................... | G06F 3/04883 345/173 |
| 2007/0097096 | A1 * | 5/2007 | Rosenberg ............ | G06F 3/0488 345/173 |
| 2007/0106942 | A1 * | 5/2007 | Sanaka ............... | G06F 3/04883 715/733 |
| 2009/0254869 | A1 * | 10/2009 | Ludwig ............... | G06F 3/04883 715/863 |
| 2009/0309848 | A1 * | 12/2009 | Terada ............... | G06F 3/04883 345/173 |
| 2010/0235793 | A1 * | 9/2010 | Ording ................. | G06F 3/0488 345/173 |
| 2011/0285656 | A1 * | 11/2011 | Yaksick .............. | G06F 3/04883 345/173 |

(Continued)

FOREIGN PATENT DOCUMENTS

KR     1020130034765     4/2013

*Primary Examiner* — Nathan Danielsen
(74) *Attorney, Agent, or Firm* — The Farrell Law Firm, P.C.

(57) ABSTRACT

An apparatus and method for inputting an object of an electronic device are provided. The electronic device includes a display; and a processor configured to control display of an object input screen on the display, and to change a configuration for the output object input screen on a basis of an input received on the display.

15 Claims, 14 Drawing Sheets

(56) References Cited

U.S. PATENT DOCUMENTS

| | | | |
|---|---|---|---|
| 2012/0032945 A1* | 2/2012 | Dare | G06F 3/0488 |
| | | | 345/418 |
| 2012/0154313 A1 | 6/2012 | Au et al. | |
| 2013/0082976 A1 | 4/2013 | Kang | |
| 2014/0002502 A1* | 1/2014 | Han | G06F 3/0488 |
| | | | 345/646 |
| 2014/0380247 A1* | 12/2014 | Tecarro | G06F 3/04883 |
| | | | 715/863 |

\* cited by examiner

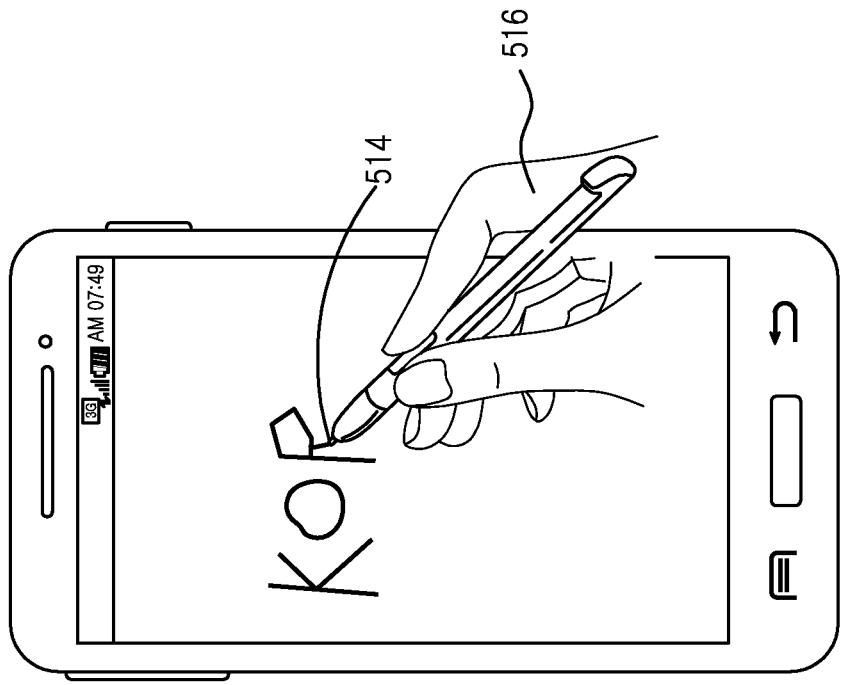
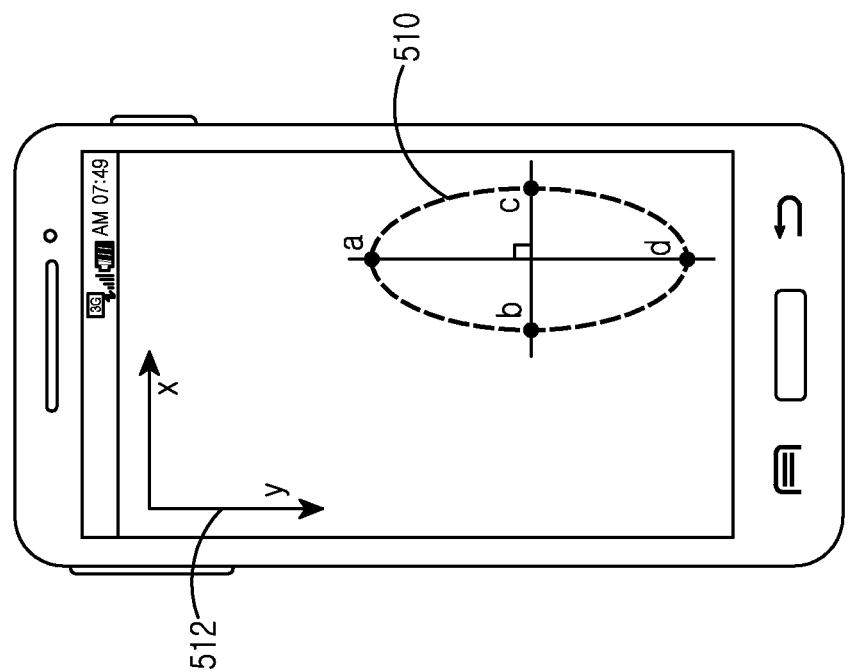
FIG.5B
FIG.5A

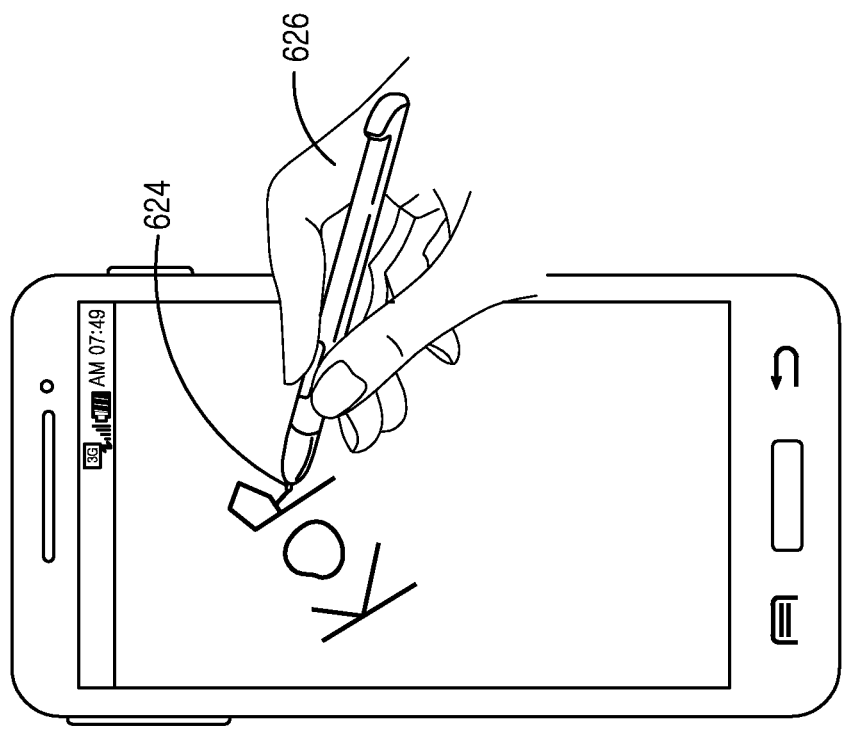
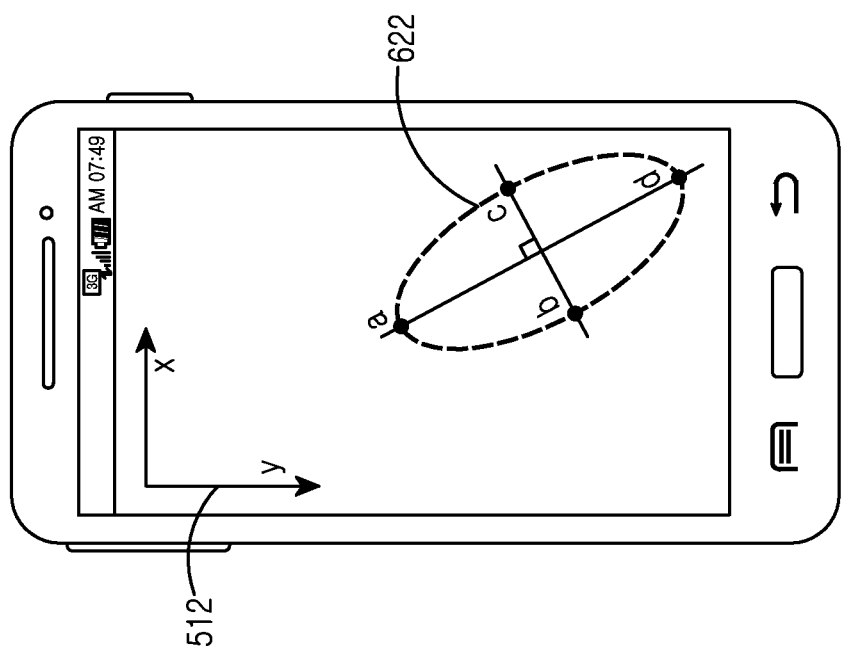
FIG.6A
FIG.6B

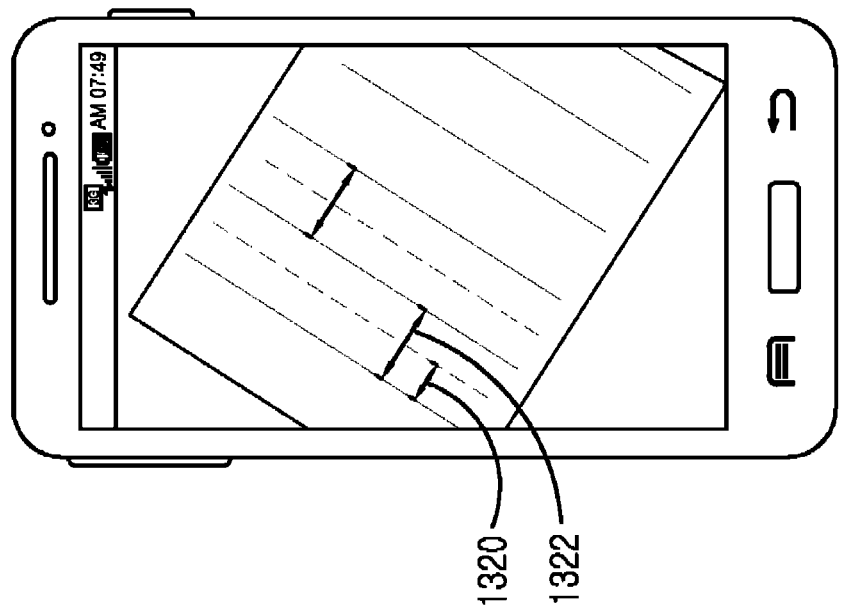
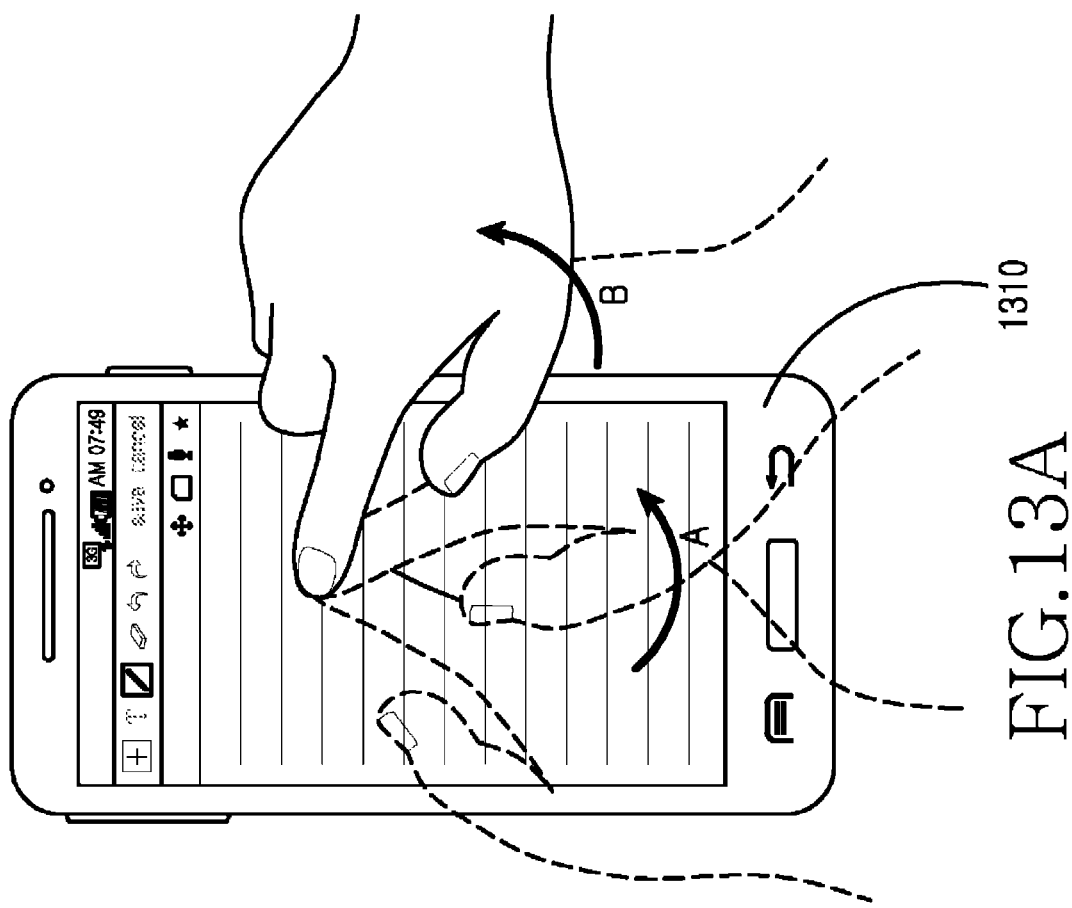
FIG.13A
FIG.13B

METHOD FOR INPUTTING DATA AND AN ELECTRONIC DEVICE THEREOF

PRIORITY

This application claims priority under 35 U.S.C. § 119(a) to Korean Patent Application Serial No. 10-2014-0027114, which was filed in the Korean Intellectual Property Office on Mar. 7, 2014, the entire content of which is incorporated herein by reference.

BACKGROUND

1. Field of the Invention

The present invention relates generally to an electronic device, and more particularly, to an apparatus and method for inputting an object of an electronic device.

2. Description of the Related Art

The number of electronic devices that perform one or more functions in a converging manner has been increasing in recent years. Further, a particular form of mobile terminal known as a smart phone is a primary example of such electronic devices. In particular, a mobile terminal have a touch-type display module with a large-sized screen, and a high-definition camera module, and thus can capture a still picture and a moving picture, in addition to typical functions, such as communication with a peer user. Further, a mobile terminal may be able to play multimedia content such as music, videos, and the like, and can access a network to perform web surfing. By employing a high performance processor, mobile terminals have been gradually evolving to perform various functions at a faster speed, and therefore, have been remarkably developed to an extent that communication with a peer user, which was previously considered a main function of mobile terminals, is now considered as a mere additional function.

Touch screens, which have been variously used in electronic devices in recent years, can receive input and display information in one screen. An electronic device having a touch screen can support an object adding function for adding a text, a number, and/or a figure (hereinafter, generally referred to as an "object") to a displayed screen by using a direct input or hovering input of an input tool such as a finger, a stylus pen, or an electronic pen.

In general, an object adding function may be executed by using a specific application such as a memo application or an image editing application. Further, the object adding function may also be executed upon detection of an input satisfying a condition, for example, a touch input, a key input, or the like, in a state where a home screen or the like is displayed.

The electronic device may detect a direct input or non-contact input (e.g., a hovering input) of an input means such as a finger, a stylus pen, or an electronic pen.

Such an input may have a different shape (e.g., a location, an inclination) on a basis of an input pattern.

SUMMARY OF THE INVENTION

Accordingly, the present invention has been made to address at least the problems and/or disadvantages described above and to provide at least the advantages described below.

According to an aspect of the present invention, a user may generate an input for adding an object in a state where a part of a hand is fixed by using a part of an electronic device as a support. According to another embodiment of the present invention, the user may generate an input for adding an object in a state where a part of a hand is fixed while the hand is not in contact with the electronic device. The object may be generated horizontally according to a direction in which a support is achieved by the hand or may be generated in other ways.

Another aspect of the present invention provides an electronic device which processes an object to be generated by an input such that the object is generated in a horizontal direction.

Another aspect of the present invention provides an electronic device which changes a configuration of an output screen such that an object is added horizontally.

Another aspect of the present invention changes a configuration of a screen which is output on the basis of an input pattern of a user.

Another aspect of the present invention provides an electronic that recognizes an input pattern on the basis of a direction in which a support is achieved by a hand.

According to an aspect of the present invention, a method of inputting an object of an electronic device is provided. The method includes determining an input pattern for a touch screen; determining a screen configuration corresponding to the input pattern; and outputting an object input screen according to the determined screen configuration.

According to an aspect of the present invention, an electronic device is provided. The electronic device includes a display; and a processor configured to control display of an object input screen on the display, and to change a configuration for the output object input screen on a basis of an input received on the display.

According to an aspect of the present invention, a computer readable recording medium recording a program is provided. The program executes operations including determining an input pattern for an output screen; determining a screen configuration corresponding to the input pattern; and changing an output screen according to the determined screen configuration.

BRIEF DESCRIPTION OF THE DRAWINGS

The above and other aspects, features and advantages of certain embodiments of the present invention will be more apparent from the following detailed description taken in conjunction with the accompanying drawings, in which:

FIGS. 5A and 5B are diagrams illustrating a situation where a normal direction input is decided in an electronic device according to various embodiments of the present invention;

FIGS. 6A and 6B are diagrams illustrating a situation where an inclination input is decided in an electronic device according to various embodiments of the present invention;

FIGS. 13A and 13B are diagrams illustrating an operation of changing a configuration of an output screen in an electronic device according to another embodiment of the present invention.

DETAILED DESCRIPTION OF EMBODIMENTS OF THE PRESENT INVENTION

Figure 1:
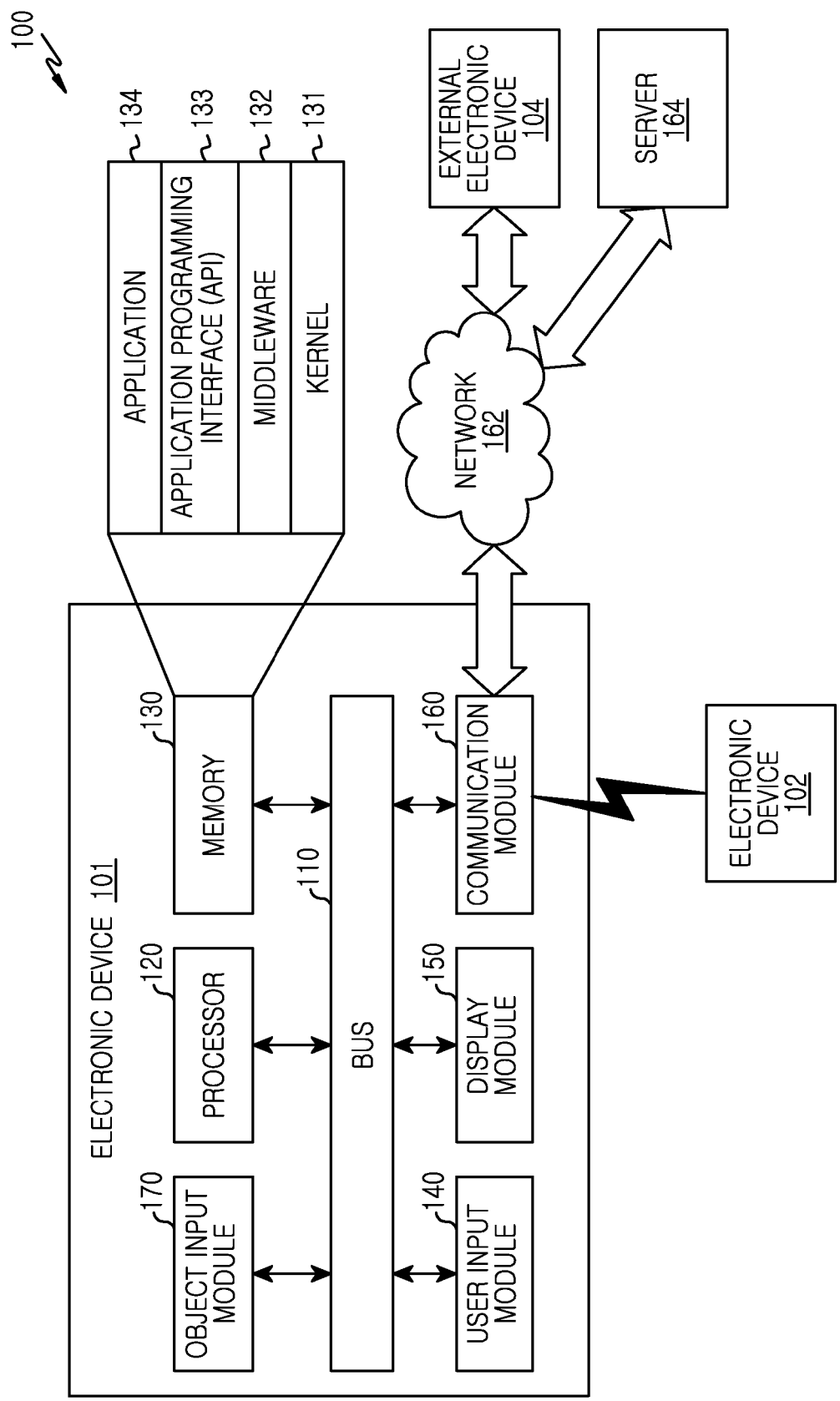
FIG. 1 is a diagram illustrating a network environment including an electronic device according to various embodiments of the present invention.

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness. In the following description, the same or similar reference numerals may be used to designate the same or similar elements.

In the following description, the expressions "include" or "may include" refer to the existence of a corresponding function, operation, or element, and does not limit one or more additional functions, operations, or elements. Also, as used herein, the terms "include" and/or "have" should be construed to denote existence of a certain feature, number, step, operation, element, component or a combination thereof, and should not be construed to exclude the existence or possible addition of one or more other features, numbers, steps, operations, elements, components, or combinations thereof.

Also, as used herein, the expression "or" includes any or all combinations of words enumerated together. For example, the expression "A or B" may include A, may include B, or may include both A and B.

Herein, the expressions "a first", "a second", "the first", "the second", and the like may modify various elements, but the corresponding elements are not limited by these expressions. For example, the above expressions do not limit the sequence and/or importance of the corresponding elements. The above expressions may be used merely for the purpose of distinguishing one element from other elements. For example, a first user device and a second user device indicate different user devices although both of them are user devices. For example, a first element may be referred to as a second element, and similarly, a second element may be referred to as a first element without departing from the scope of the embodiments of the present invention.

When an element is referred to as being "coupled" or "connected" to any other element, it should be understood that not only the element may be directly coupled or connected to the other element, but also a third element may be interposed therebetween. By contrast, when an element is referred to as being "directly coupled" or "directly connected" to any other element, it should be understood that no element is interposed therebetween.

The terms used in the following description are used to describe specific embodiments, and are not intended to limit embodiments of the present invention. As used herein, the singular forms are intended to include the plural forms as well, unless the context clearly indicates otherwise.

Unless defined otherwise, all terms used herein, including technical and scientific terms, have the same meaning as those commonly understood by a person of ordinary skill in the art to which the embodiments of the present invention pertain. Such terms as those defined in a generally used dictionary are to be interpreted to have definitions equivalent to the contextual definitions in the relevant field of the art, and are not to be interpreted to have ideal or excessively formal meanings unless clearly defined herein.

An electronic device according to embodiments of the present invention may be a device including a communication function. For example, the electronic device may include at least one of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), a Motion Picture Experts Group (MPEG) Audio Layer 3 (MP3) player, a mobile medical device, a camera, a wearable device (e.g., a Head-Mounted-Device (HMD), such as electronic glasses, electronic clothes, an electronic bracelet, an electronic necklace, an electronic appcessory, an electronic tattoo, and a smart watch).

According to an embodiment of the present invention, an electronic device may be a smart home appliance having a communication function. The smart home appliance may include at least one of, for example, a television, a Digital Video Disk (DVD) player, an audio player, a refrigerator, an air conditioner, a cleaner, an oven, a microwave oven, a washing machine, an air purifier, a set-top box, a TeleVision (TV) box (e.g., HomeSync™ of Samsung, Apple TV™, or Google TV™), a game console, an electronic dictionary, an electronic key, a camcorder, or an electronic frame.

According to some embodiments of the present invention, the electronic device may include at least one of various types of medical devices (e.g., Magnetic Resonance Angiography (MRA), Magnetic Resonance Imaging (MRI), Computed Tomography (CT), a scanning machine, ultrasonic wave device and the like), a navigation device, a Global Positioning System (GPS) receiver, an Event Data Recorder (EDR), a Flight Data Recorder (FDR), a car infotainment device, ship electronic equipment (e.g., navigation equipment for a ship, a gyro compass and the like), avionics, a security device, and an industrial or home robot.

According to some embodiments of the present invention, the electronic device may include at least one of furniture or a part of a building/structure, an electronic board, an electronic signature receiving device, a projector, and various types of measuring devices (e.g., a water meter, an electric meter, a gas meter, a radio wave meter and the like) including a communication function. The electronic device according to embodiments of the present invention may be a combination of one or more of the aforementioned various devices. Further, the electronic device according to embodiments of the present invention is not limited to the aforementioned devices.

Hereinafter, an electronic device according to various embodiments of the present invention is described with reference to the accompanying drawings. Herein, the term "user" may refer to a person who uses an electronic device or a device (e.g., an artificial intelligence electronic device) that uses an electronic device.

FIG. 1 is a diagram illustrating a network environment including an electronic device 101 according to various embodiments of the present invention.

Referring to FIG. 1, an electronic device 101 included in a network environment 100 includes a bus 110, a processor 120, a memory 130, an input/output module 140, a display 150, a communication module 160, and an object input module 170.

The bus 110 is a circuit that interconnects the above-described elements of the electronic device 101 and delivers communications (e.g. control messages) between the above-described elements.

For example, the processor 120 receives instructions from the aforementioned other elements (e.g. the memory 130, the input/output interface 140, the display 150, the communication module 160, and the object input module 170) through the bus 110, deciphers the received instructions, and performs calculation or data processing according to the deciphered instructions.

The memory 130 may store instructions or data received from or created by the processor 120 or other elements (e.g. the input/output module 140, the display 150, the communication module 160, and the object input module 170). The memory 130 may include programming modules, such as a kernel 131, middleware 132, an Application Programming Interface (API) 133, an application 134, and the like. The aforementioned programming modules may be formed of software, firmware, hardware, or a combination thereof.

The kernel 131 controls or manages system resources (e.g. the bus 110, the processor 120, or the memory 130) used for executing an operation or a function implemented in the remaining other programming modules (e.g., the middleware 132, the API 133, or the application 134). In addition, the kernel 131 provides an interface through which the middleware 132, the API 133, or the application 134 controls or manages the individual elements of the electronic device 101 while accessing the individual elements.

The middleware 132 performs a relay function of allowing the API 133 or the application 134 to communicate with the kernel 131 to exchange data therewith. Furthermore, in regard to task requests received from the applications 134, the middleware 132 controls (e.g. scheduling or load balancing) the task requests, using a method of allocating at least one of the applications 134 or a priority for using the system resources (e.g. the bus 110, the processor 120, and the memory 130) of the electronic device 101.

The API 133 is an interface through which the application 134 control functions provided by the kernel 131 or the middleware 132, and include at least one interface or function (e.g. instruction) for file control, window control, image processing, or text control.

According to various embodiments of the present invention, the applications 134 may include a Short Message Service (SMS)/Multimedia Message Service (MMS) application, an e-mail application, a calendar application, an alarm application, a health care application (e.g. an application for measuring an amount of exercise or blood sugar), and an environmental information application (e.g. an application for providing an atmospheric pressure, humidity, temperature, and the like). Additionally or alternately, the application 134 may be an application related to the exchange of information between the electronic device 101 and an external electronic device 104. An application related to the exchange of such information may include, for example, a notification relay application for transferring particular pieces of information to the external electronic device or a device management application for managing the external electronic device.

For example, the notification relay application may include a function of transferring, to the external electronic device 104, notification information generated in other applications of the electronic device 101 (e.g. an SMS/MMS application, an e-mail application, a health management application, an environmental information application, and the like). Additionally or alternatively, the notification relay application may receive notification information from, for example, the external electronic device 104 and provide the received notification information to a user. For example, the device management application may manage (e.g. install, delete, or update) functions for at least a part of the external electronic device 104 communicating with the electronic device 101 (e.g. turning on/off the external electronic device itself (or some elements thereof) or adjusting the brightness (or resolution) of a display), applications operating in the external electronic device, or services (e.g. a telephone call service or a message service) provided from the external electronic device.

According to various embodiments, the applications 134 may include an application appointed according to the attribute (e.g. the type) of the external electronic device 104. For example, in cases where the external electronic device is an MP3 player, the applications 134 may include an application related to the reproduction of music. Similarly, in cases where the external electronic device is a mobile medical appliance, the applications 134 may include an application related to health care. According to an embodiment of the present invention, the applications 134 may include at least one of an application designated to the electronic device 101 and an application received from a server 106 or the external electronic device 104.

The input/output module 140 may transfer instructions or data input from a user through an input/output device (e.g. the sensor, a keyboard, or a touch screen) to, for example, the processor 120, the memory 130, the communication module 160, or the object input module 170 through the bus 110. For example, the input/output module 140 may provide, to the processor 120, data for a user's touch input through the touch screen. Furthermore, through the input/output device (e.g. a speaker or a display), the input/output module 140 may output instructions or data received from the processor 120, the memory 130, the communication module 160, or the object input module 170 through the bus 110. For example, the input/output module 140 may output voice data, processed through the processor 120, to a user through a speaker.

The display 150 displays various pieces of information (e.g. multimedia data or text data) to a user.

The communication module 160 connects communications between the electronic device 101 and the external electronic device (e.g. the external electronic device 104 or the server 106). For example, the communication module 160 may be connected to a network 162 through wireless or wired communication to communicate with the external device. The wireless communication may include, for example, Wi-Fi (Wireless Fidelity), Bluetooth (BT), Near Field Communication (NFC), Global Positioning System (GPS) and cellular communication (e.g. Long Term Evolution (LTE), LTE-A, Code Division Multiple Access (CDMA), Wideband CDMA (WCDMA), Universal Mobile Telecommunication System (UMTS), Wireless Broadband (WiBro), and Global System for Mobile communication (GSM)). The wired communication may include, for example, a Universal Serial Bus (USB), a High Definition Multimedia Interface (HDMI), Recommended Standard 232 (RS-232), and a Plain Old Telephone Service (POTS).

According to an embodiment of the present invention, the network 162 may be a telecommunication network. The communication network may include at least one of a computer network, the Internet, the Internet of things, and a telephone network. According to an embodiment of the present invention, a protocol (e.g. a transport layer protocol, data link layer protocol, or a physical layer protocol) for communication between the electronic device 101 and the external device 104 may be supported by at least one of the application 134, the API 133, the middleware 132, the kernel 131, and the communication module 160.

According to an embodiment of the present invention, the object input module 170 may detect a second input in a state where a screen for an object input is output. The second input is an input which is distinguished from an input for the object input. The second input may be a touch (e.g., a palm touch, an area touch) performed by a hand placed on a touch screen for the object input. Herein, the term "area touch" refers to a touch corresponding to a region including a plurality of points on the touch screen. Also, the second input may be a non-contact input such as a hovering which forms an area.

According to an embodiment of the present invention, the object input module 170 determines an input pattern of user of the electronic device 101 on the basis of the second input region and changes a configuration of an output screen. According to various embodiments of the present invention, the object input module 170 may change at least one of a direction of the output screen and a line interval of the object input screen such that an object is added horizontally.

Figure 2:
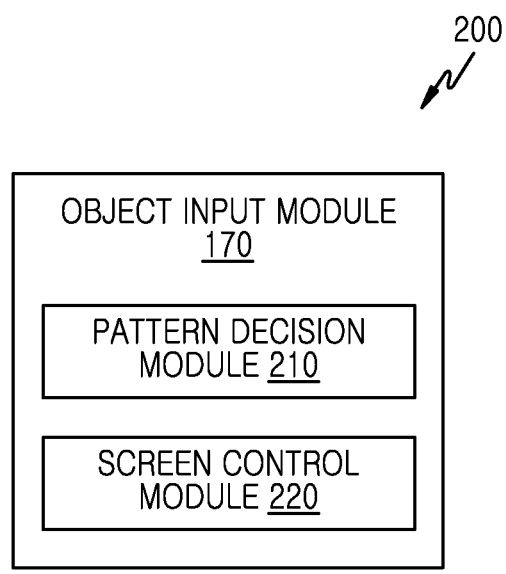
FIG. 2 is a diagram illustrating a configuration of an object input module according to various embodiments of the present invention.

Additional information on the object input module 170 is described with reference to FIGS. 2 to 14 herein below. FIG. 2 illustrates a configuration of an object input module according to various embodiments of the present invention.

Referring to FIG. 2, the object input module (e.g., the object input module 170 of FIG. 1) according to an embodiment of the present invention, includes a pattern decision module 210 and a screen control module 220.

The pattern decision module 210 may decide an inclination input pattern in a state where an object input screen is output. According to various embodiments of the present invention, the inclination input pattern is an input pattern of a user for a situation where an object is not input horizontally on the object input screen, for example, a memo screen. According to various embodiments of the present invention, the inclination input pattern may be an input pattern rotated by a specific angle with respect to a reference input pattern.

According to various embodiments of the present invention, the pattern decision module 210 determines the inclination input pattern on the basis of a second input region. According to various embodiments of the present invention, the pattern decision module 210 determines the inclination input pattern on the basis of the second input region and a reference region. According to various embodiments of the present invention, the pattern decision module 210 confirms the second input region on the basis of a reference point. The reference point may be a part of a plurality of input points detected by a touch (e.g., a palm touch, an area touch) made by a hand placed on the touch screen (e.g., a palm, side, or the like of the hand). According to various embodiments of the present invention, the reference point may be a part of a plurality of input points detected by a non-contact touch (e.g., hovering, etc.) that is input in a state where the hand is separated within a specific distance from the touch screen. The pattern decision module 210 may confirm a second region corresponding to an ellipse shape, a square shape, an atypical shape, or the like which passes through the reference point.

According to various embodiments of the present invention, the pattern decision module 210 defines the reference region corresponding to a verticality or horizontality, and confirms the inclination input pattern on the basis of the second region and the reference region.

The screen control module 220 allows the previously output object input screen to be changed to a screen corresponding to the inclination input pattern.

According to various embodiments of the present invention, the screen control module 220 changes a direction or angle of the object input screen on the basis of a direction or angle of the inclination input pattern.

According to various embodiments of the present invention, the electronic device includes a display and a processor. The processor may be configured to display an object input screen on the display, and change a configuration for the output object input screen on the basis of an input received on the display.

According to various embodiments of the present invention, the electronic device further includes a memory for storing the configuration for the object input screen corresponding to a plurality of inputs.

According to various embodiments of the present invention, the processor is configured to change the configuration for the output object input screen by detecting an input with an area having a width at least equal to a width of a specific area.

According to various embodiments of the present invention, the processor is configured to include the configuration for the output object input screen by using at least one of a direction, angle, and area for the input.

According to various embodiments of the present invention, the processor may be configured to restore the configuration for the input screen when the object input is complete.

According to various embodiments of the present invention, the processor is configured to change the configuration by rotating the object input screen on the basis of the input received on the display.

According to various embodiments of the present invention, the processor is configured to change the configuration by adjusting a line interval of the object input screen on the basis of the input received on the display.

According to various embodiments of the present invention, the processor is configured to change the configuration for the object input screen on the basis of a direct input or indirect input made by an input means.

Figure 3:
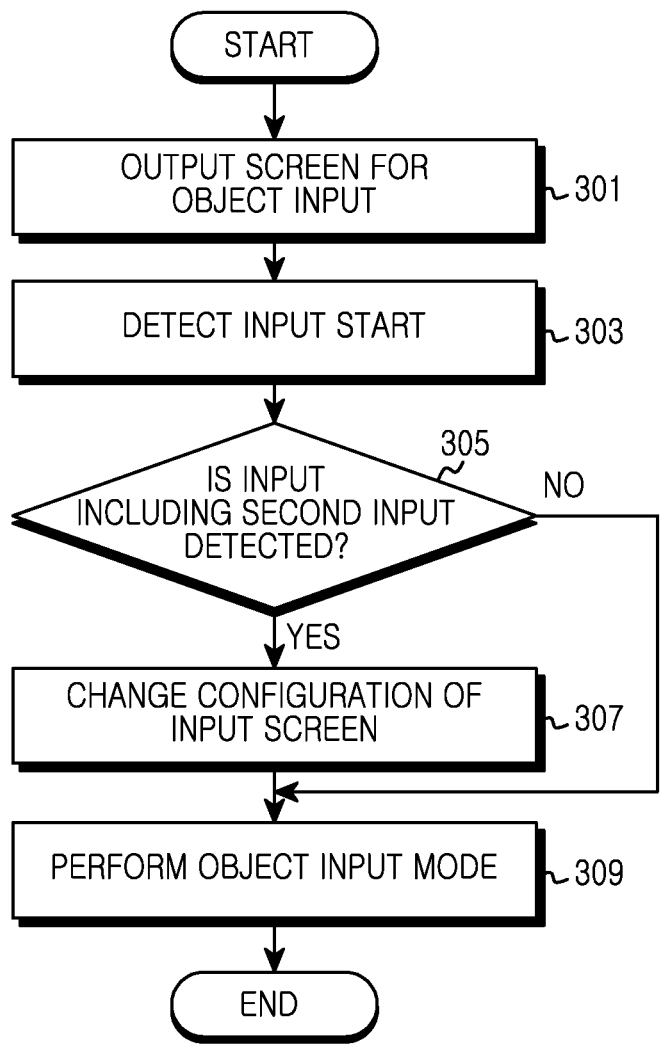
FIG. 3 is a flowchart illustrating an operation of adding an object of an electronic device according to various embodiments of the present invention.

FIG. 3 is a flowchart illustrating an operation of adding an object of an electronic device according to various embodiments of the present invention.

Referring to FIG. 3, in step 301, the electronic device outputs a screen for inputting an object. The object is generated by an input, for example, at least one stoke. The object may include at least one of a symbol, a character, a letter, a number, a word, a shape, and a pattern. A screen for inputting the object may include a screen for executing all applications capable of receiving an object input such as a memo application, an image editing application, and the like. According to various embodiments of the present invention, the screen for inputting the object may be output through at least one layer. According to various embodiments of the present invention, the screen for outputting the object may be output to a part of a region of the same layer. According to various embodiments of the present invention, the screen for inputting the object may be a background screen. According to various embodiments of the present invention, the screen for inputting the object may be output in a popup shape in a state where the background screen is output.

In step 303, the electronic device detects a start of an input for allowing an object to be added. According to an embodiment of the present invention, the electronic device detects a start of an input of directly touching a touch screen by an input tool such as a finger, a stylus pen, or an electronic pen. According to another embodiment of the present invention, the electronic device detects the input tool located within a specific distance from the touch screen. For example, the electronic device may detect a start of an input called a hovering touch, a floating touch, an indirect touch, a proximity touch, or a non-contact input, in addition to the input of directly touching the touch screen. According to various embodiments of the present invention, the start of the input is detected when an object starts to be actually input, or the start of the input may be detected when a signal of the input tool is detected within a specific distance of the touch screen or is detected with signal strength at least equal to a specific value. According to another embodiment of the present invention, the start of the input may be detected through a trigger event such as a menu selection, a button selection, or the like.

In step 305, the electronic device confirms whether an input including a second input is detected. The second input is an input that is distinguished from an input for the object input, and may be a touch (e.g., a palm touch, an area touch) made by a hand placed on a touch screen for the object input. If the input is made in a state where the hand is placed within a specific distance from the touch screen, the second input may be detected as a non-contact input, for example, a hovering input, or the like.

In step 307, the electronic device changes a configuration of an output screen upon detection of the input including the second input. The electronic device may change the configuration of the output screen so that an object is input horizontally. According to an embodiment of the present invention, the electronic device changes a direction of the output screen on the basis of at least one of a shape, direction, area, and size of the second output (e.g., an input region corresponding to the second input) so that the object is input horizontally. According to another embodiment of the present invention, the electronic device changes a shape or direction of a guideline included in the output screen on the basis of at least one of the shape, direction, area, and size of the second input so that the object is input horizontally. The guideline included in the output screen may be a line capable of defining a line interval. According to another embodiment of the present invention, the electronic device adjusts an output magnification for the output screen on the basis of at least one of the shape, direction, area, and size of the second input. According to another embodiment of the present invention, the electronic device changes a color or template of the output screen on the basis of at least one of the shape, direction, area, and size of the second input.

In step 309, the electronic device performs an object input mode by using the output screen changed on the basis of the second input. The electronic device performs a typical object input mode upon detection of an input not including the second input.

The change of the configuration of the output screen according to various embodiments of the present invention may be performed according to an embodiment of the present invention described as follows.

The electronic device may output a note screen including a horizontal line as the output screen for the object input. The electronic device may rotate the note screen, which is output in a normal direction, in a pre-defined direction or angle on the basis of the second input. In another embodiment of the present invention, the electronic device may adjust an interval of a line included in the note screen on the basis of the second input. If the note screen is output in a popup shape, the note screen may be rotated together with a background screen or only the popup note screen may be rotated.

Figure 4:
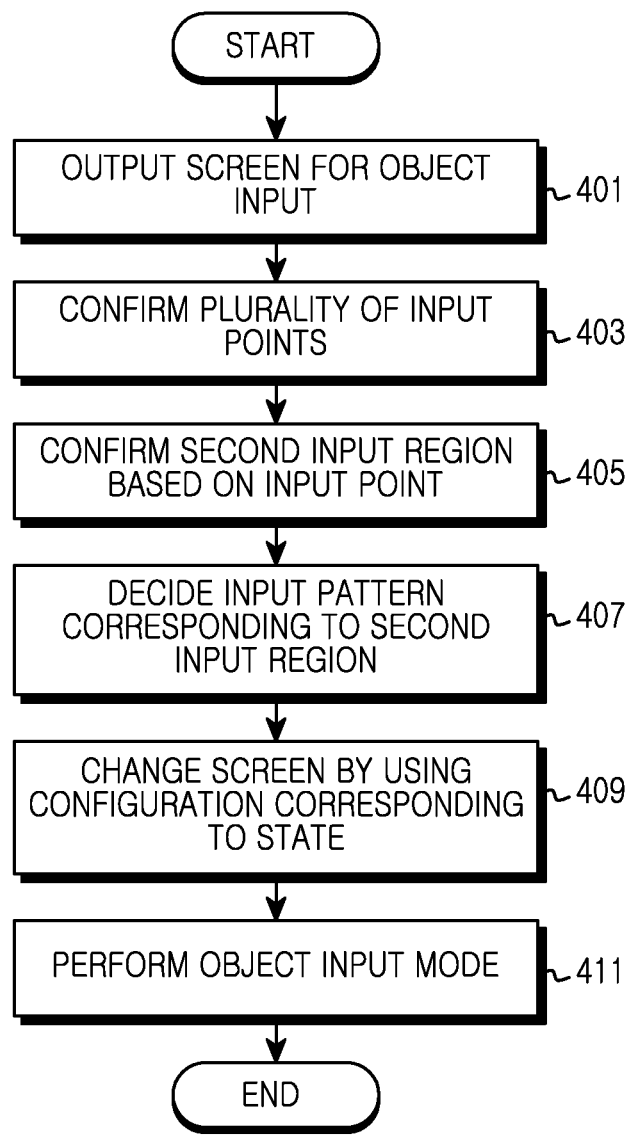
FIG. 4 is a flowchart illustrating an operation of adding an object of an electronic device according to an embodiment of the present invention.

FIG. 4 is a flowchart illustrating an operation of adding an object of an electronic device according to an embodiment of the present invention.

In step 401, the electronic device outputs a screen for inputting an object. According to an embodiment of the present invention, the electronic device outputs an object input screen corresponding to a normal direction to a display module. Herein, the term "normal direction" refers to a direction when the object input screen is placed horizontally or vertically that conforms to a shape of a display.

In step 403, the electronic device confirms a plurality of input points. According to various embodiments of the present invention, the electronic device confirms the plurality of input points to confirm an input pattern. The input pattern may include at least one of a left hand input, a right hand input, an input angle, and an angle of a hand. According to an embodiment of the present invention, the electronic device confirms a plurality of input points by using a direct touch or an indirect touch.

In step 405, the electronic device confirms a second input region on the basis of the plurality of input points. According to an embodiment of the present invention, the second input is an input that is distinguished from an input for the object input, and may be a touch (e.g., a palm touch, an area touch) made by a hand placed on a touch screen (e.g., a palm, side, or the like of the hand) for the object input. If the input is made in a state where the hand is within a specific distance from the touch screen, the second input may be detected as a non-contact input such as a hovering input, or the like.

According to various embodiments of the present invention, the electronic device defines a part of detected input points as a reference point, and defines the second input region on the basis of the reference point. According to various embodiments of the present invention, the reference point may be an end point among the detected input points or a center of the input region. According to various embodiments of the present invention, the electronic device may define the second input region having a pre-defined shape that passes each reference point by defining an input point corresponding to an edge of upper, lower, left, and right sides as the reference point. The second input region may have an ellipse shape, a square shape, an atypical shape, or the like that passes through the reference point.

In step 407, the electronic device may decide an input pattern on the basis of the second input region. According to various embodiments of the present invention, the electronic device may decide an input pattern on the basis of at least one of a shape, direction, and size of the second input region.

According to an embodiment of the present invention, the electronic device defines a reference region corresponding to a verticality and a horizontality. The reference region may form a specific area, or may be one or more axes representing the verticality or the horizontality. An input pattern of a user may be confirmed on the basis of the reference region and the second input region. According to an embodiment of the present invention, if the second input region inclined in a counterclockwise direction with respect to the reference region is confirmed, the electronic device confirms an input pattern in which a user inputs an object in a state where a hand is inclined in the counterclockwise direction.

According to another embodiment of the present invention, the electronic device determines one reference line in the second input region, may confirm at least one of an inclination and direction of the second input region by using the reference region and the determined reference line, and may decide an input pattern by using the determination result. According to an embodiment of the present invention, the electronic device confirms the input pattern by using the reference line and the reference region of the touch screen.

In step 409, the electronic device may changes an output screen by using a configuration for the input pattern. According to an embodiment of the present invention, the electronic device changes a screen to the screen corresponding to the input pattern in a state where an inclination of a screen for each input pattern is defined. The electronic device changes at least one of an angle, location, area, magnification, color, and template with respect to the output screen according to the input pattern.

In step 411, the electronic device performs an object input mode by using the output screen of which the configuration is changed.

Although the input pattern is decided on the basis of the reference region and the input region confirmed based on the input point in FIG. 4, according to various embodiments of the present invention, the electronic device decides the input pattern on the basis of a pattern of the input point and the reference region. According to an embodiment of the present invention, the electronic device may omit step 405.

FIGS. 5A and 5B are diagrams illustrating a situation where a normal direction input is decided in an electronic device according to various embodiments of the present invention.

Referring to FIGS. 5A and 5B, according to an embodiment of the present invention, the electronic device decides an inclination input pattern on the basis of a second input region. According to various embodiments of the present invention, the inclination input pattern may be an input pattern of a user for a situation in which an object is not input horizontally on the object input screen, for example, a memo screen. According to various embodiments of the present invention, the inclination input pattern may be an input pattern rotated by a specific angle with respect to a reference input pattern.

According to various embodiments of the present invention, the inclination input pattern is decided on the basis of a second input region 510 and a reference region 512. According to various embodiments of the present invention, the electronic device confirms the second region on the basis of a reference point. The reference point is a part of a plurality of input points detected by a touch (e.g., a palm touch, an area touch) made by a hand placed on the touch screen (e.g., a palm, side, or the like of the hand). According to various embodiments of the present invention, the reference point is a part of a plurality of input points detected by a non-contact touch (e.g., hovering, etc.) that is input in a state in which the hand is separated from the touch screen, while within a specific distance from the touch screen. The electronic device confirms the second region corresponding to an ellipse shape, a square shape, an atypical shape, or the like, which passes through the reference point.

According to various embodiments of the present invention, the electronic device defines a reference region corresponding to a verticality or horizontality, and confirms the inclination input pattern on the basis of the second region and the reference region.

According to various embodiments of the present invention, if it is confirmed that the second region 510 having an ellipse shape passing through reference points a, b, c, and d is in a state of maintaining a normal direction with respect to the reference region 512 as shown in FIGS. 5A and 5B, the electronic device detects an input pattern 516 for allowing an object 514 to be input horizontally 514.

FIGS. 6A and 6B are diagrams illustrating a situation in which an inclination input is decided in an electronic device according to various embodiments of the present invention.

According to various embodiments invention, if it is confirmed that a second region 622 having an ellipse shape passing through reference points a, b, c, and d is inclined in a counterclockwise direction with respect to the reference region 512 as shown in FIGS. 6A and 6B, the electronic device confirms an input pattern 626 for allowing an object 624 to be input in a state where a user inclines a hand in the counterclockwise direction.

Figure 7C:
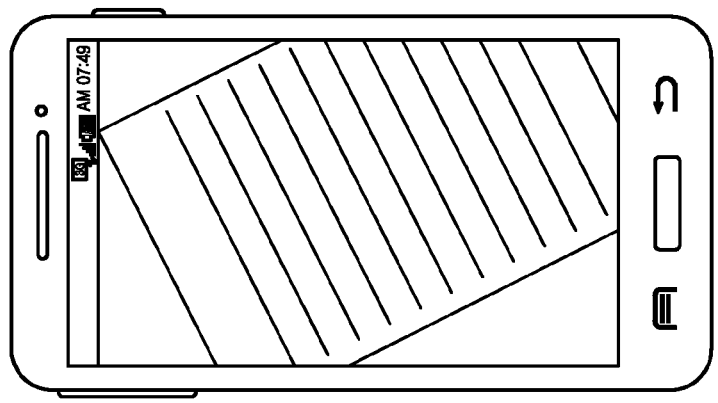
FIGS. 7A to 7C are diagrams illustrating an operation of changing a configuration of an output screen in an electronic device according to various embodiments of the present invention.
Figure 7B:
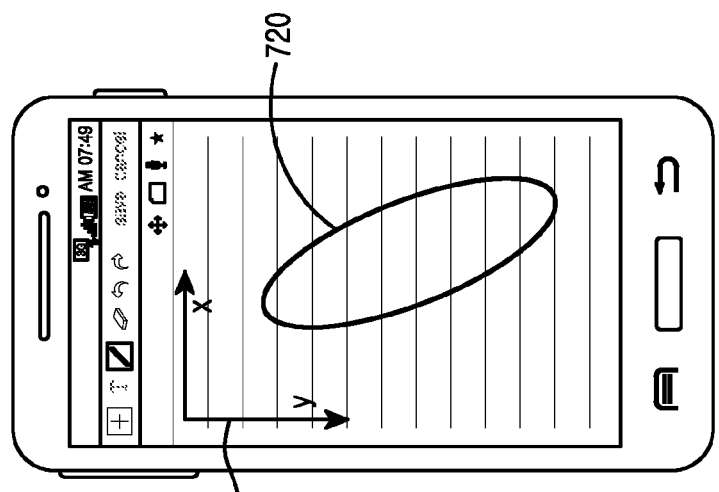
Figure 7A:
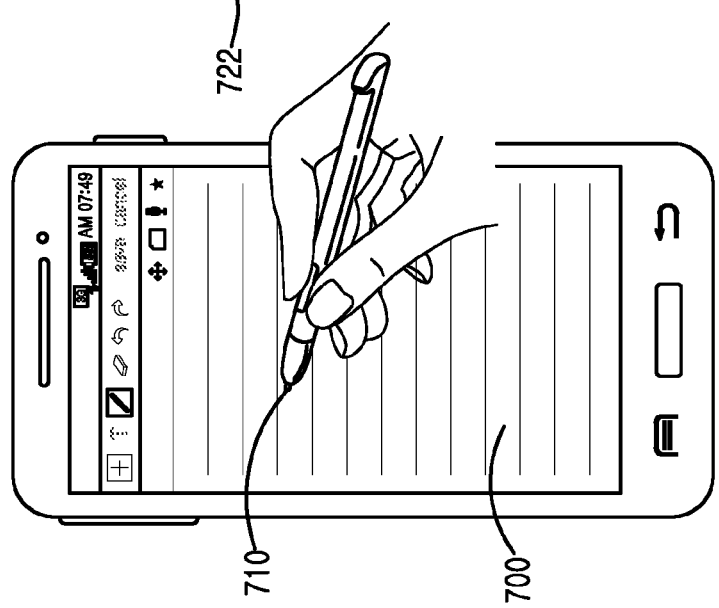

FIGS. 7A to 7C illustrate an operation of changing a configuration of an output screen in an electronic device according to various embodiments of the present invention.

Referring to FIG. 7A, according to various embodiments of the present invention, in a state where a screen 700 for an object input is output, the electronic device detects an input for the input object 710. Herein, the input for the input object 710 may be an input made by a finger, a stylus, and an electronic pen. In the presently-described embodiment of the present invention, the input is referred to as a first input.

According to various embodiments of the present invention, the electronic device may detect a second input. The second input may be an area touch input. According to an embodiment of the present invention, the second input may be a touch (e.g., a palm touch, an area touch) made by a hand (e.g., a palm, side, or the like of the hand) supporting the touch screen or a non-contact input, such as a hovering, that forms an area. According to various embodiments of the present invention, the electronic device detects the second input before or during generation of the object.

According to various embodiments of the present invention, the electronic device may detect the second input on the basis of an input detected simultaneously during a predetermined time. According to an embodiment of the present invention, even if a touch screen is touched by a palm or side of a hand of a user, the electronic device detects a plurality of inputs within a specific time, since the palm or side of the hand is not flat. The electronic device may detect an area input by the palm or side of the hand on the basis of the detected plurality of inputs, for example, an input region corresponding to the second input, and may decide an input pattern by using the input region.

Referring to FIG. 7B, an input region 720 corresponding to the second input is a region defined by the electronic device including a plurality of detected input points. According to an embodiment of the present invention, the input region 720 may be a region having a formal form (e.g., an ellipse-shaped region). According to another embodiment of the present invention, the input region 720 may be a region having an informal form.

The electronic device decides whether there is a change in an output screen configuration by using at least one of a shape, direction, and inclination of the region 720 corresponding to the second input.

According to an embodiment of the present invention, the electronic device decides whether there is a change in an output screen configuration by using a reference region 722 and the input region 720 corresponding to the second input. According to various embodiments of the present invention, the reference region 722 is a pre-defined vertical or horizontal reference axis. According to various embodiments of the present invention, the electronic device confirms an inclination of the input region with respect to the reference region 722, and changes the configuration of the output screen by using a direction or angle corresponding to the inclination.

If the input region 720 corresponding to the second input is inclined in a counterclockwise direction with respect to the reference region 722 as shown in FIG. 7B, the electronic device adjusts the inclination of the output screen as shown in FIG. 7C. According to various embodiments of the present invention, the electronic device restores the changed screen configuration when an object input operation is complete. The object may be input horizontally to the output screen, even if the object is input with an inclination input pattern in a state where the inclination of the output screen is adjusted.

Figure 8C:
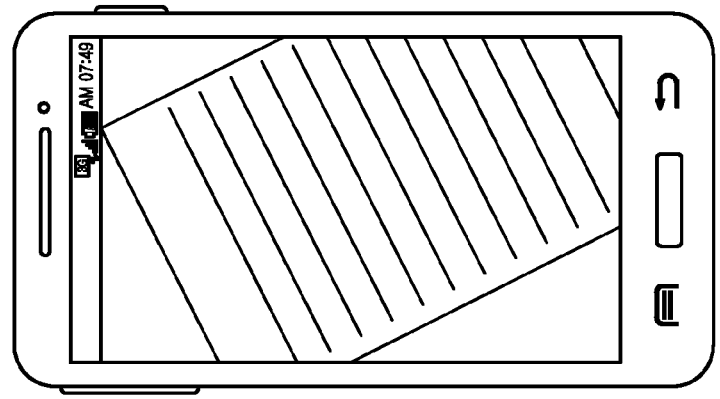
FIGS. 8A to 8C are diagrams illustrating an operation of changing a configuration of an input screen in an electronic device according to another embodiment of the present invention.
Figure 8B:
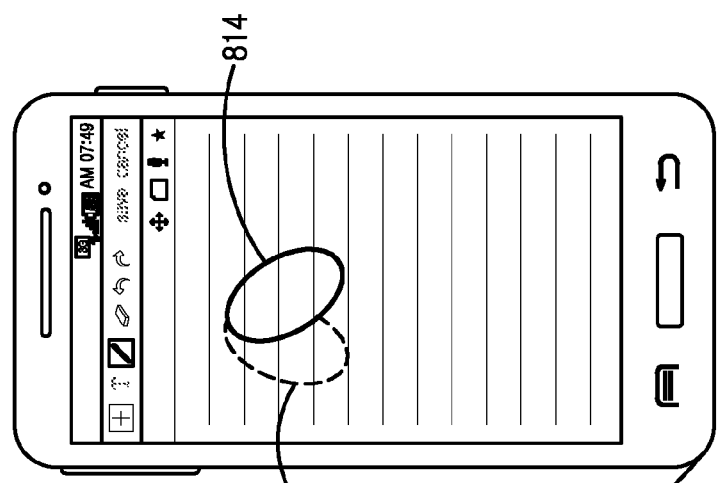
Figure 8A:
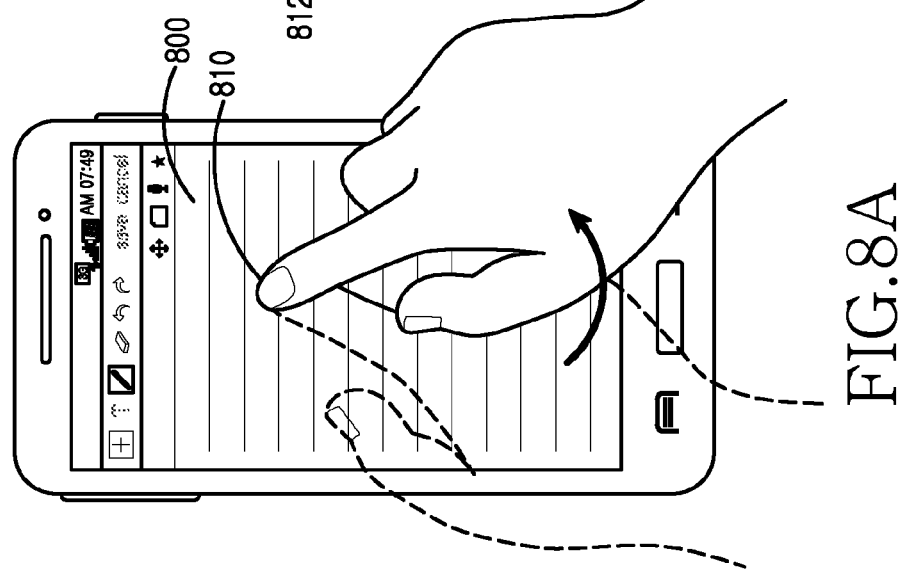

FIGS. 8A to 8C are diagrams illustrating an operation of changing a configuration of an input screen in an electronic device according to another embodiment of the present invention.

Referring to FIGS. 8A to 8C, according to an embodiment of the present invention, an electronic device detects an input 810 in a state in which a screen 800 for an object input is output. Herein, the input is an input for changing an output screen configuration, and is distinguished from an input for the object input. According to an embodiment of the present invention, the input may be a touch input for changing an input state while maintaining a specific area, and the input for changing the input state may include an input for changing an angle while maintaining the touch input.

If the angle is changed while maintaining the specific area, as shown in FIG. 8A, the electronic device may confirm that shape 812 of an input area is changed to area 814, such as shown in FIG. 8B. A situation where a direction of a finger touch area is changed is illustrated in the figure.

The electronic device changes the configuration of the output screen according to the shape of the input area. The electronic device adjusts an inclination of an output screen according to an inclination of the finger touch area, as shown in FIG. 8C.

Figure 9C:
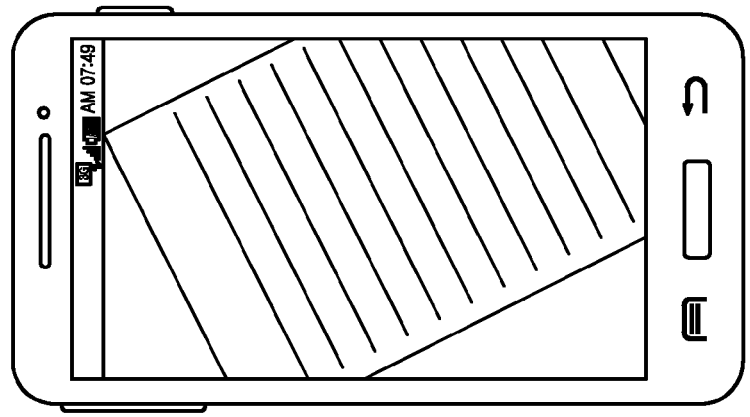
FIGS. 9A to 9C are diagrams illustrating an operation of changing a configuration of an input screen in an electronic device according to another embodiment of the present invention.
Figure 9B:
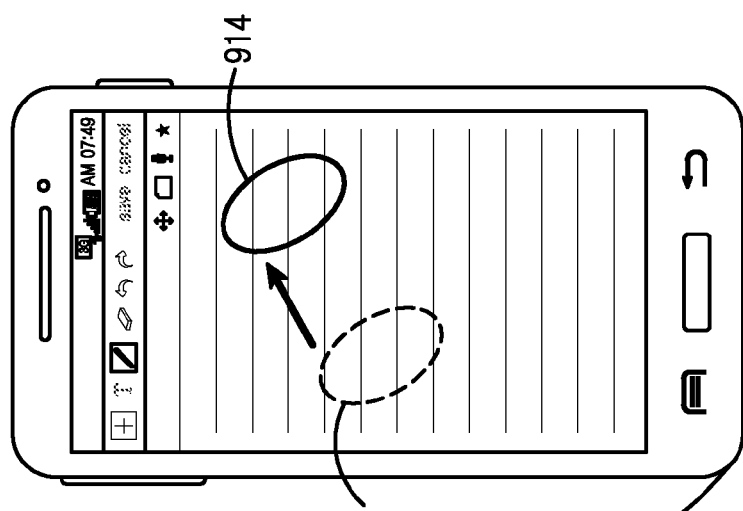
Figure 9A:
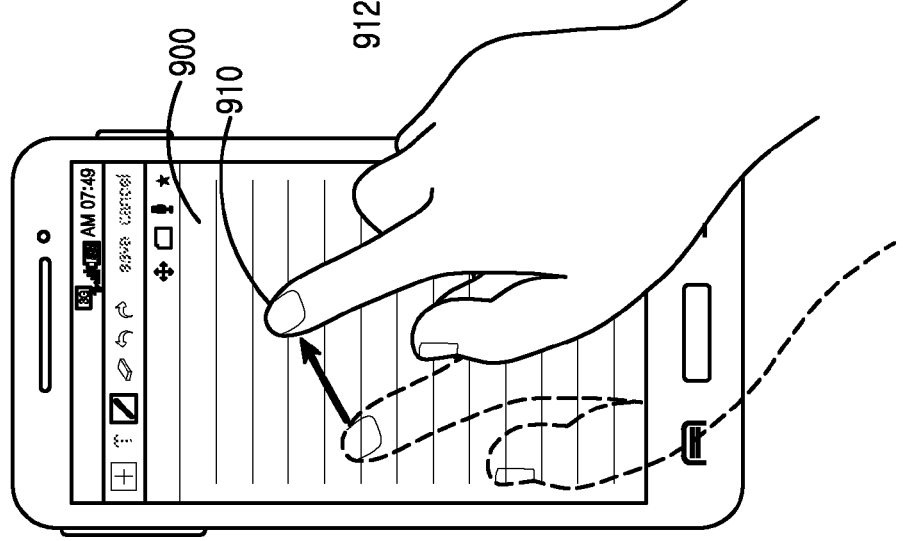

FIGS. 9A to 9C are diagrams illustrating an operation of changing a configuration of an input screen in an electronic device according to another embodiment of the present invention.

Referring to FIGS. 9A to 9C, according to an embodiment of the present invention, an electronic device detects an input 910 in a state in which a screen 900 for an object input is output. Herein, the input 910 is an input for changing an output screen configuration, and is distinguished from an input for the object input. According to an embodiment of the present invention, the input 910 may be a touch input for changing an input state while maintaining a specific area, and the input for changing the input state may include an input for changing an input point while maintaining the touch input.

If the input point is changed in a state where a specific area is maintained as shown in FIG. 9A, the electronic device may confirm that a shape 912 of the input area is changed to area 914, as shown in FIG. 9B. A situation, in which a location of a finger touch area is changed, is shown in FIGS. 9A to 9C.

The electronic device changes the configuration of the output screen according to the shape of the input area. The electronic device adjusts an inclination of an output screen according to a movement of the finger touch area, as shown in FIG. 9C.

Figure 10B:
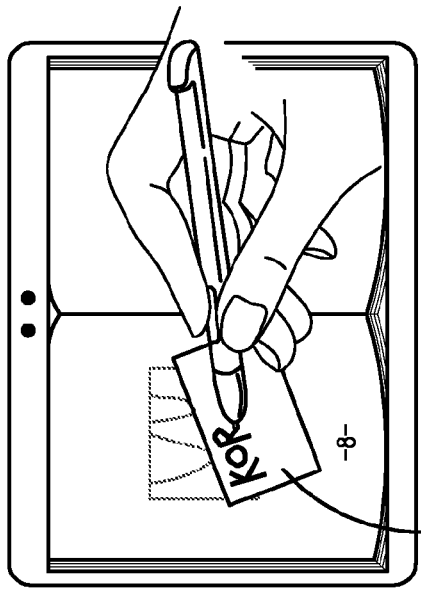
FIGS. 10A to 10C are diagrams illustrating an operation of changing a configuration of an input screen in an electronic device according to another embodiment of the present invention.
Figure 10A:
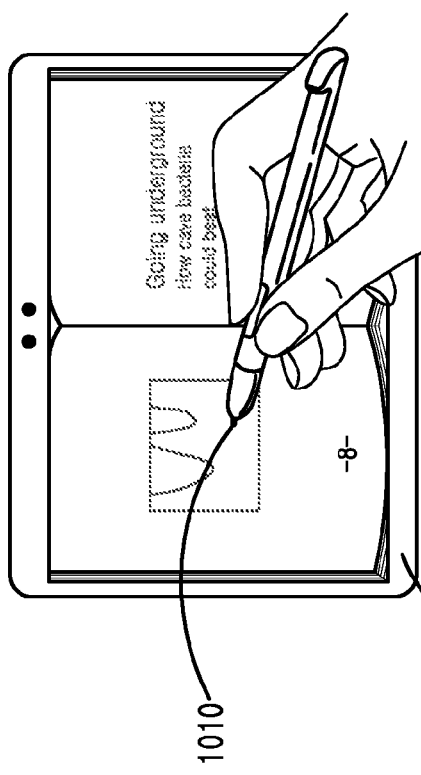
Figure 10C:
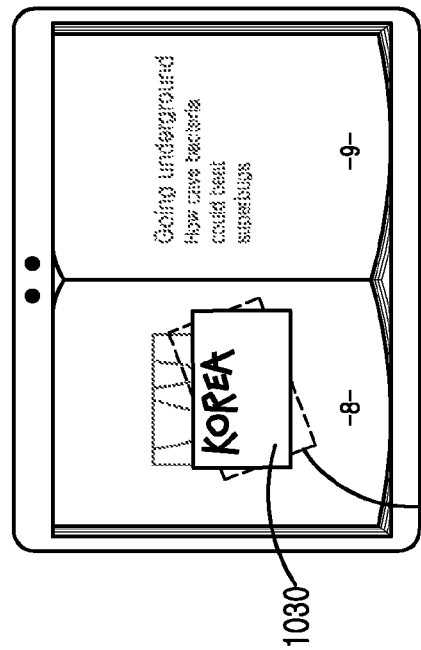

FIGS. 10A to 10C illustrate an operation of changing a configuration of an input screen in an electronic device according to another embodiment of the present invention.

Referring to FIGS. 10A to 10C, according to an embodiment of the present invention, an electronic device 1000 outputs a content play screen. The electronic device adds an object corresponding to an input on a displayed content. According to an embodiment of the present invention, the electronic device adds the object in a state in which an e-book execution screen is output, as shown in FIG. 10A. According to another embodiment of the present invention, the electronic device adds the object in a state in which a webpage regarding a Uniform Resource Locator (URL) is received by executing a browser including Mozilla, Firefox, Internet Explorer, Google Chrome, Opera, Safari, or the like. According to another embodiment of the present invention, the electronic device adds the object in a state in which image data is output.

The electronic device outputs an object input region on an output screen when an input 1010 for adding an object is detected in a state in which the content play screen is output. According to an embodiment of the present invention, the object input region may include a layer that is distinguished from the content play screen or a part of a region of the same layer, or may include different layers, which are then combined with a layer of a content, when the input is complete.

The electronic device may change a configuration (e.g., a region size, a region direction, a location, etc.) of the object input region on the basis of an input pattern of the user. According to an embodiment of the present invention, the electronic device may rotate the object input region by an angle corresponding to the input pattern of the user 1020, as shown in FIG. 10B.

An object added according to the same input pattern may change in shape along with a change in the configuration of the object input region. According to an embodiment of the present invention, although the object may not have a horizontal form in a state where the configuration of the object input region is not changed, an object that has a horizontal form may be added by changing the configuration of the object input region.

When the object input operation is complete, the electronic device may restore the configuration of the changed object input region 1020 to an original state 1030, as shown in FIG. 10C.

FIGS. 10A to 10C describe an embodiment of the present invention in which the electronic device generates and outputs an object input region upon detection of an input on a content play screen according to various embodiments of the present invention. However, according to various embodiments of the present invention, a region (e.g., an empty region of an e-book screen) in which an object can be added may be determined in the output screen and may be used as an object input region. According to another embodiment of the present invention, the electronic device may change a configuration of the output object input region by using a shape corresponding to the input. The electronic device may detect an input intension or an input regarding the output object input region, and may change at least one of a size, shape, and location of the previously output object input region.

Figure 11B:
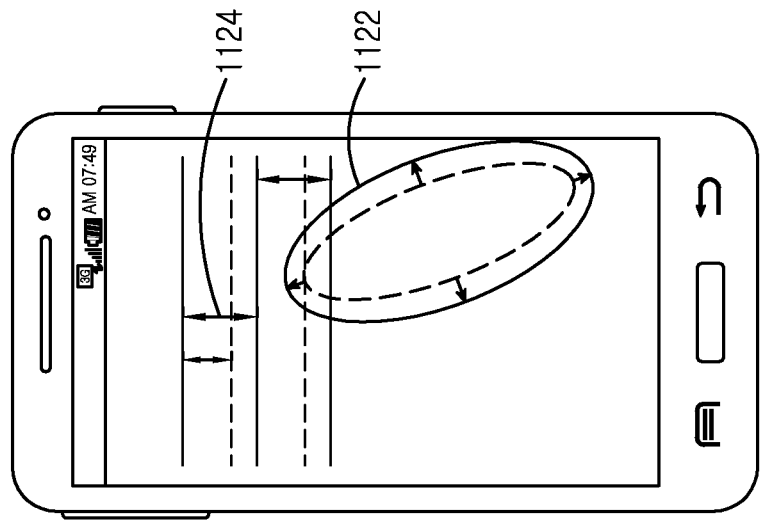
FIGS. 11A and 11B are diagrams illustrating an operation of changing a configuration of an input screen in an electronic device according to another embodiment of the present invention.
Figure 11A:
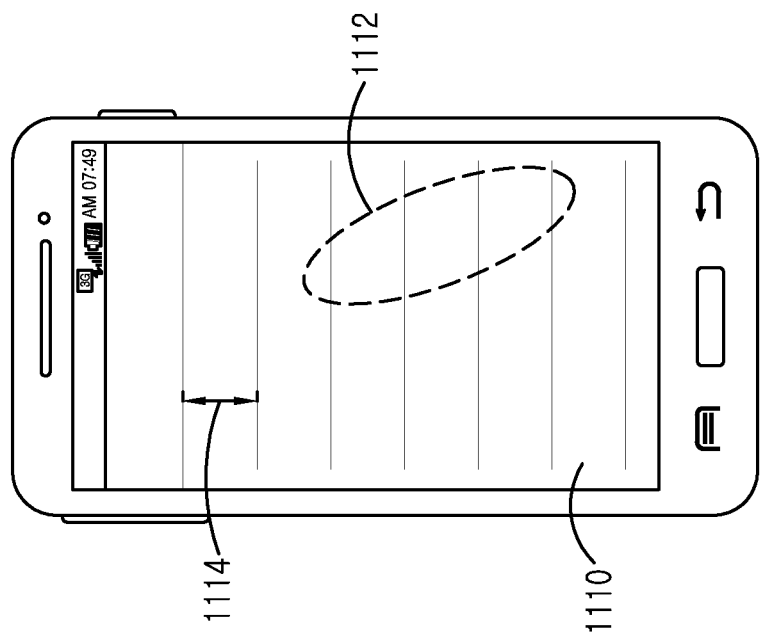

FIGS. 11A and 11B are diagrams illustrating an operation of changing a configuration of an input screen in an electronic device according to another embodiment of the present invention.

Referring to FIGS. 11A and 11B, according to an embodiment of the present invention, an electronic device detects an input in a state in which a screen 1110 for an object input is output, as shown in FIG. 11A. According to an embodiment of the present invention, the screen for the object input includes a guideline that defines a line interval 1114. The input is an input that is distinguished from an input for the object input, and may be a touch (e.g., a palm touch, an area touch) made by a hand placed on a touch screen for the object input or a non-contact input, such as a hovering that forms an area.

An input region (i.e., a second input region) 1112 shown in FIGS. 11A and 11B is a region having a shape similar to an ellipse and defined by the electronic device as an area touch region including a plurality of input points.

The electronic device may decide whether the output screen configuration is changed by using an area of the second input region.

According to embodiment of the present invention, the electronic device decides whether there is a change in the configuration of the output screen configuration by using a pre-defined reference area and an area of the second input region. According to an embodiment of the present invention, if it is determined that the area of the second input region is wider than the reference area 1122 shown in FIG. 11B, the electronic device increases an interval of a guideline that defines a line interval 1124. A relation between a hand size and the area of the second input region is considered in the example of FIGS. 11A and 11B. According to various embodiments of the present invention, when an area of the second input region is large (i.e., when the user has a large hand), an object can be added while maintaining a wide line interval.

Figure 12A:
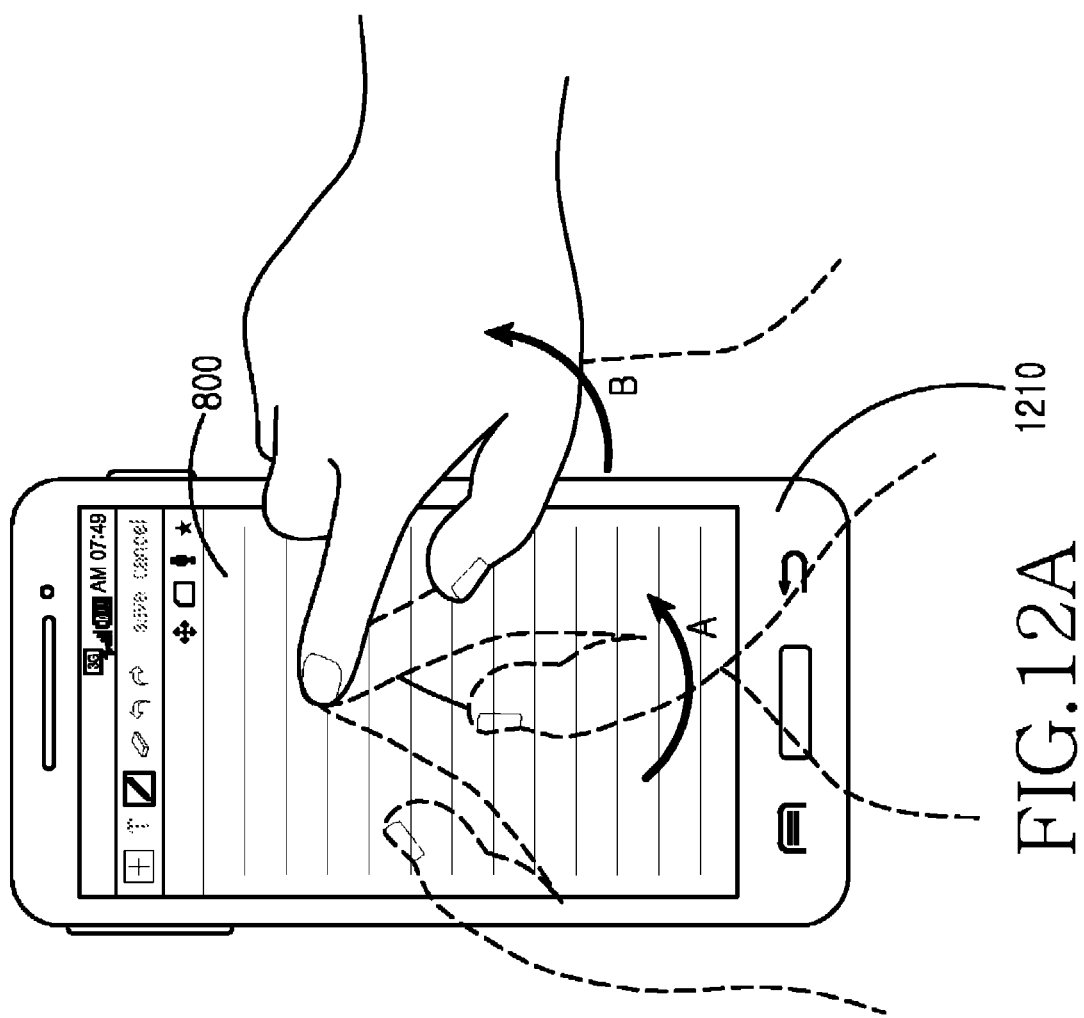
FIGS. 12A and 12B are diagrams illustrating an operation of changing a configuration of an output screen in an electronic device according to another embodiment of the present invention.
Figure 12B:
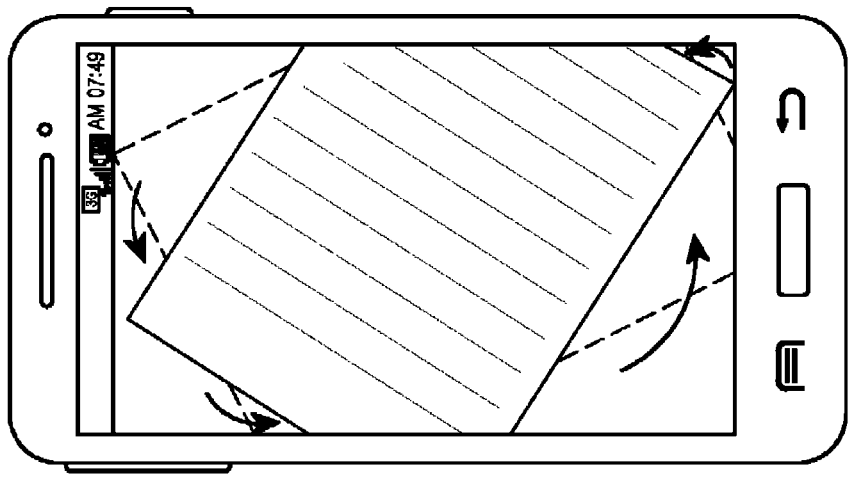

FIGS. 12A and 12B are diagrams illustrating an operation of changing a configuration of an output screen in an electronic device according to another embodiment of the present invention.

Referring to FIGS. 12A and 12B, according to an embodiment of the present invention, an electronic device detects an input for changing an output screen configuration in a state in which a screen for an object input is output. According to an embodiment of the present invention, an input for changing an angle can be detected in a state where a specific area is maintained.

The electronic device rotates an output screen according to the input. A rotation level of the output screen may be determined on a basis of a change level of the input.

According to an embodiment of the present invention, the electronic device divides an input change range on the basis of a specific angle, and defines a rotation level of an output screen with respect to each range.

If an input corresponding to a range B can be detected in a state in which an output screen is rotated according to a change in an input corresponding to a range A as shown in FIG. 12A, the electronic device changes a rotation state of the output screen, as shown in FIG. 12B.

FIGS. 13A and 13B are diagrams illustrating an operation of changing a configuration of an output screen in an electronic device according to another embodiment of the present invention.

Referring to FIGS. 13A and 13B, according to an embodiment of the present invention, an electronic device detects an input for changing an output screen configuration in a state in which a screen for an object input is output. According to an embodiment of the present invention, an input for changing an angle is detected in a state in which a specific area is maintained.

The electronic device changes an interval of a guideline included in an output screen in accordance with an input. The interval of the guideline is determined on the basis of an input change level.

According to an embodiment of the present invention, the electronic device divides an input change range on the basis of a specific angle, and defines the interval of the guideline with respect to each range.

Upon detecting an input corresponding to a range B in a state in which the interval of the guideline is adjusted according to a change in an input corresponding to a range A as shown in FIG. 13A, the electronic device 1310 changes an interval 1320 of a predetermined guideline 1322, as shown in FIG. 13B.

Although an embodiments of the present invention that include changing a configuration of an output screen on the basis of an input for changing an angle in a state where a specific area is maintained are described with reference to FIGS. 12A and 12B and FIGS. 13A and 13B, an electronic device according to various embodiments of the present invention may change the configuration of the output screen on the basis of an input for changing a location in a state where a specific area is maintained. According to an embodiment of the present invention, the electronic device defines a change level on the basis of a distance of locations for movement.

If an electronic device according to various embodiments of the present invention is accessible for each user, an input pattern for each user may be stored and managed, so that a configuration of an output screen can be automatically changed if a corresponding user has access thereto. According to an embodiment of the present invention, the electronic device may manage an input pattern for information of each user (e.g., an IDentification (ID)).

According to various embodiments of the present invention, a method of inputting an object of an electronic device may include deciding an input pattern for a touch screen, determining a screen configuration corresponding to the input pattern, and outputting an object input screen by using the determined screen configuration.

According to various embodiments of the present invention, outputting the object input screen may include any of outputting the object input screen on a background screen, outputting the object input screen by adding a layer, and using a certain region of the background screen as the object input screen.

According to various embodiments of the present invention, deciding the input pattern may include confirming an area touch, confirming at least one of an inclination, direction, area, rotation, and movement of the confirmed area touch, and comparing each confirmed information item with corresponding pre-defined reference information.

According to various embodiments of the present invention, determining the screen configuration corresponding to the input pattern may include determining at least one of a rotation direction, rotation angle, color, and magnification corresponding to the input pattern.

According to various embodiments of the present invention, the determining of the screen configuration corresponding to the input pattern may include determining at least one of a line interval and line shape corresponding to the input pattern.

According to various embodiments of the present invention, the method of inputting the object of the electronic device may include managing the input pattern by using user information, confirming a user who uses the electronic device, and determining a screen configuration by confirming an input pattern for the confirmed user.

According to various embodiments of the present invention, deciding the input pattern for the touch screen may include deciding a pattern for direct or indirect input for the touch screen.

Figure 14:
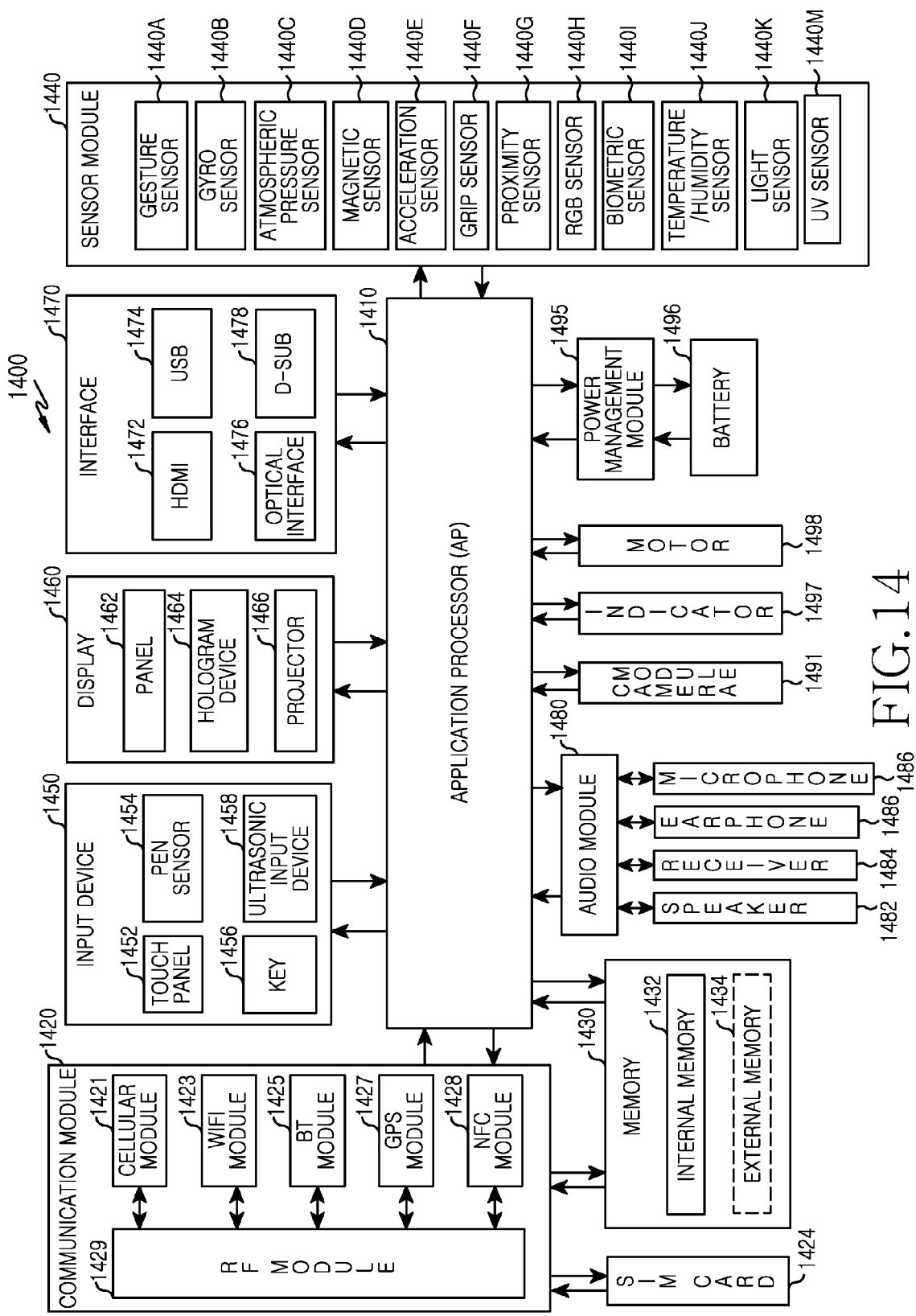
FIG. 14 is a block diagram illustrating an electronic device according to various embodiments of the present invention.

FIG. 14 is a block diagram illustrating an electronic device 1400 according to various embodiments of the present invention. The electronic device 1400 may include a configuration of, for example, all or a part of the electronic device 101 illustrated in FIG. 1.

Referring to FIG. 14, the electronic device 1400 includes at least one Application Processor (AP) 1410, a communication module 1420, a Subscriber Identifier Module (SIM) card 1424, a memory 1430, a sensor module 1440, an input device 1450, a display 1460, an interface 1470, an audio module 1480, a camera module 1491, a power management module 1495, a battery 1496, an indicator 1497, and a motor 1498.

The AP 1410 controls a plurality of hardware or software elements connected to the AP 1410 by driving an operating system or an application program and processes various types of data including multimedia data and perform calculations. The AP 1410 may be implemented by, for example, a System on Chip (SoC). According to an embodiment of the present invention, the AP 1410 may further include a Graphic Processing Unit (GPU) (not shown).

The communication module 1420 (e.g. the communication module 160) performs data transmission/reception in communication between the electronic device 1400 (e.g. the electronic device 101) and other electronic devices (e.g. the external electronic device 104 and the server 106) connected thereto through a network. According to an embodiment of the present invention, the communication module 1420 includes a cellular module 1421, a Wi-Fi module 1423, a BT module 1425, a GPS module 1427, an NFC module 1428, and a Radio Frequency (RF) module 1429.

The cellular module 1421 may provide a voice call, a video call, a Short Message Service (SMS), or an Internet service through a communication network (e.g. LTE, LTE-A, CDMA, WCDMA, UMTS, WiBro, or GSM). Furthermore, the cellular module 1421 may distinguish and authenticate electronic devices within a communication network using, for example, a Subscriber Identification Module (SIM) card 1424. According to an embodiment of the present invention, the cellular module 1421 may perform at least some functions that the AP 1410 may provide. For example, the cellular module 1421 may perform at least some of the multimedia control functions that may be provided by the AP 1410.

According to an embodiment of the present invention, the cellular module 1421 includes a Communication Processor (CP). Furthermore, the cellular module 1421 may be implemented by, for example, an SoC. Although the elements such as the cellular module 1421 (e.g. a communication processor), the memory 1430, and the power management module 1495 are illustrated as separate from the AP 1410 in FIG. 14, the AP 1410 may include at least some (e.g. the cellular module 1421) of the aforementioned elements according to an embodiment of the present invention.

According to an embodiment of the present invention, the AP 1410 or the cellular module 1421 (e.g. communication processor) may load, in a volatile memory, a command or data received from at least one of a non-volatile memory and other elements connected thereto, and may process the loaded command or data. Furthermore, the AP 1410 or the cellular module 1421 may store data received from or generated by at least one of other elements in a non-volatile memory.

The Wi-Fi module 1423, the BT module 1425, the GPS module 1427, and the NFC module 1428 may include, for example, a processor for processing data transmitted/received through the corresponding module. In FIG. 14, the cellular module 1421, the WiFi module 1423, the BT module 1425, the GPS module 1427, and the NFC module 1428 are illustrated as separate blocks, but some (e.g., two or more) of the cellular module 1421, the WiFi module 1423, the BT module 1425, the GPS module 1427, and the NFC module 1428 may be included in one Integrated Chip (IC) or one IC package. For example, some (e.g. the communication processor corresponding to the cellular module 1421 and the Wi-Fi processor corresponding to the Wi-Fi module 1423) of the processors corresponding to the cellular module 1421, the Wi-Fi module 1423, the BT module 1425, the GPS module 1427, and the NFC module 1428 may be implemented by one SoC.

The RF module 1429 transmits/receives data, such as an RF signal, for example. Although not illustrated, the RF module 1429 may include, for example, a transceiver, a Power Amp Module (PAM), a frequency filter, a Low Noise Amplifier (LNA) or the like. Further, the RF module 1429 may further include a component for transmitting/receiving electronic waves over a free air space in wireless communication, for example, a conductor, a conducting wire or the like. Although the cellular module 1421, the Wi-Fi module 1423, the BT module 1425, the GPS module 1427, and the NFC module 1428 share one RF module 1429 in FIG. 14, at least one of the cellular module 1421, the Wi-Fi module 1423, the BT module 1425, the GPS module 1427, and the NFC module 1428 may transmit/receive an RF signal through a separate RF module, according to an embodiment of the present invention.

The SIM card 1424 is a card that may be inserted into a slot formed at a particular position of the electronic device. The SIM card 1424 may include unique identification information (e.g., an Integrated Circuit Card IDentifier (ICCID)) or subscriber information (e.g., International Mobile Subscriber Identity (IMSI)).

The memory 1430 (e.g. the memory 120) may include an internal memory 1432 and/or an external memory 1434. The internal memory 1432 may include, for example, at least one of a volatile memory (e.g. a Dynamic RAM (DRAM), a Static RAM (SRAM), and a Synchronous Dynamic RAM (SDRAM)), and a non-volatile Memory (e.g. a One Time Programmable ROM (OTPROM), a Programmable ROM (PROM), an Erasable and Programmable ROM (EPROM), an Electrically Erasable and Programmable ROM (EE-PROM), a mask ROM, a flash ROM, a NAND flash memory, and an NOR flash memory).

According to an embodiment of the present invention, the internal memory 1432 may be a Solid State Drive (SSD). The external memory 1434 may further include (not shown) a flash drive, for example, a Compact Flash (CF), a Secure Digital (SD), a Micro Secure Digital (Micro-SD), a Mini Secure Digital (Mini-SD), an extreme Digital (xD), or a memory stick. The external memory 1434 may be functionally connected to the electronic device 1400 through various interfaces. According to an embodiment of the present invention, the electronic device 1400 may further include a storage device (or a storage medium) such as a hard disc drive.

The sensor module 1440 measures a physical quantity or detects an operation state of the electronic device 1400 and converts the measured or detected information into an electronic signal. The sensor module 1440 may include at least one of, for example, a gesture sensor 1440A, a gyro sensor 1440B, an atmospheric pressure sensor 1440C, a magnetic sensor 1440D, an acceleration sensor 1440E, a grip sensor 1440F, a proximity sensor 1440G, a color sensor 1440H (e.g., red, green, and blue (RGB) sensor), a biosensor 1440I, a temperature/humidity sensor 1440J, an illumination sensor 1440K, and a Ultra Violet (UV) sensor 1440M. Additionally or alternatively, the sensor module 1440 may include, for example, an E-nose sensor, an ElectroMyoGraphy (EMG) sensor, an ElectroEncephaloGram (EEG) sensor, an ElectroCardioGram (ECG) sensor, an InfraRed (IR) sensor, an iris sensor (not shown), a fingerprint sensor, and the like. The sensor module 1440 may further include a control circuit for controlling at least one sensor involved therein.

The input device 1450 may include a touch panel 1452, a (digital) pen sensor 1454, a key 1456, or an ultrasonic input device 1458. The touch panel 1452 may recognize a touch input in at least one of, for example, a capacitive scheme, a resistive scheme, an infrared scheme, and an acoustic wave scheme. Further, the touch panel 1452 may further include a control circuit. When the input device 1450 includes a capacitive type touch panel 1452, physical contact or proximity recognition is possible. The touch panel 1452 may further include a tactile layer. In this event, the touch panel 1452 may provide a tactile response to the user.

The (digital) pen sensor 1454 may be implemented, for example, using the same or a similar method to receiving a user's touch input or using a separate recognition sheet. The key 1456 may include, for example, a physical button, an optical key, or a keypad. The ultrasonic input device 1458 identifies data by detecting an acoustic wave with a microphone 1488 of the electronic device 1400 through an input unit generating an ultrasonic signal, and performs wireless recognition. According to an embodiment of the present invention, the electronic device 1400 may receive a user input from an external device (e.g., computer or server) connected thereto using the communication module 1420.

The display 1460 (e.g. the display 150) may include a panel 1462, a hologram device 1464, or a projector 1466. The panel 1462 may be, for example, a Liquid Crystal Display (LCD), an Active Matrix Organic Light Emitting Diode (AM-OLED) display, and the like. The panel 1462 may be, for example, flexible, transparent, or wearable. The panel 1462 may be integrated with the touch panel 1452 to configure one module. The hologram device 1464 may show a stereoscopic image in the air using interference of light. The projector 1466 may project light onto a screen to display an image. The screen may be located, for example, inside or outside the electronic device 1400. According to an embodiment of the present invention, the display 1460 may further include a control circuit for controlling the panel 1462, the hologram device 1464, or the projector 1466.

The interface 1470 may include, for example, a High-Definition Multimedia Interface (HDMI) 1472, a Universal Serial Bus (USB) 1474, an optical interface 1476, or a D-subminiature (D-sub) 1478. The interface 1470 may be included in, for example, the communication module 160 illustrated in FIG. 1. Additionally or alternatively, the interface 1470 may include (not shown), for example, a Mobile High-definition Link (MHL) interface, a Secure Digital (SD)/Multi-Media Card (MMC) interface, or an InfraRed Data Association (IrDA) standard interface.

The audio module 1480 bilaterally converts a sound and an electronic signal. At least some elements of the audio module 1480 may be included in, for example, the input/output module 140 illustrated in FIG. 1. The audio module 1480 processes sound information input or output through, for example, the speaker 1482, the receiver 1484, the earphones 1486, or the microphone 1488.

The camera module 1491 is a device for capturing a still image or a video, and, according to an embodiment of the present invention, the camera module 1491 may include one or more image sensors (e.g. a front sensor or a rear sensor), a lens, an Image Signal Processor (ISP), or a flash (e.g. an LED or xenon lamp).

The power management module 1495 manages power of the electronic device 1400. Although not illustrated, the power management module 1495 may include, for example, a Power Management Integrated Circuit (PMIC), a charger Integrated Circuit (IC), or a battery gauge.

The PMIC may be mounted, for example, in integrated circuits or SoC semiconductors. The charging methods may be divided into a wired type and a wireless type. The charger IC may charge a battery and prevent inflow of excessive voltage or excessive current from a charger. According to an embodiment of the present invention, the charger IC may include a charger IC for at least one of the wired charging type or the wireless charging type. The wireless charging method may include, for example, a magnetic resonance scheme, a magnetic induction scheme, or an electromagnetic scheme, and may further include an additional circuit for wireless charging, such as a coil loop, a resonance circuit, or a rectifier circuit.

The battery gauge may measure, for example, a residual quantity of the battery 1496, or a voltage, a current, or a temperature during the charging. The battery 1496 may store or generate electricity, and may supply power to the electronic device 1400 using the stored or generated electricity. The battery 1496 may include, for example, a rechargeable battery or a solar battery.

The indicator 1497 displays a specific status of the electronic device 1400 or a part (e.g. the AP 1410) of electronic device, for example, a booting status, a message status, a charging status, and the like. The motor 1498 converts an electrical signal into a mechanical vibration. Although not illustrated, the electronic device 1400 may include a processing unit (e.g. a GPU) for supporting mobile TV. The processing device for supporting mobile TV may process media data according to standards such as, for example, a Digital Multimedia Broadcasting (DMB), a Digital Video Broadcasting (DVB) or a media flow.

Each of the components of the electronic device according to embodiments of the present invention may be implemented by one or more components and the name of the corresponding component may vary depending on the type of the electronic device. The electronic device according to embodiments of the present invention may be configured by including at least one of the above-described elements, and some of the elements may be omitted, or other elements may be added. Further, some of the elements of the electronic device according to embodiments of the present invention may be combined to be one entity, which can perform the same functions as those of the components before the combination.

The term "module", as used in herein, may refer to, for example, a unit including one or more combinations of hardware, software, and firmware. The "module" may be interchangeably used with a term, such as unit, logic, logical block, component, or circuit. The "module" may be the smallest unit of an integrated component or a part thereof. The "module" may be the smallest unit that performs one or more functions or a part thereof. The "module" may be mechanically or electronically implemented. For example, the "module" according to embodiments of the present invention may include at least one of an Application-Specific Integrated Circuit (ASIC) chip, a Field-Programmable Gate Arrays (FPGA), and a programmable-logic device for performing operations which has been known or are to be developed hereinafter.

According to various embodiments of the present invention, at least some of the devices (e.g., modules or functions thereof) or the method (e.g., operations) may be implemented by a command stored in a computer-readable storage medium in a programming module form. When the command is executed by one or more processors (e.g., the processor 120), the processors may execute a function corresponding to the command. The computer-readable storage medium may be, for example, the memory 130. At least a part of the programming module may be implemented (e.g., executed) by, for example, the processor 120. At least some of the programming modules may include, for example, a module, a program, a routine, a set of instructions or a process for performing one or more functions.

The computer-readable recording medium may include magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and hardware devices specially configured to store and perform a program instruction (e.g., programming module), such as a Read Only Memory (ROM), a Random Access Memory (RAM), a flash memory and the like. In addition, the program instructions may include high class language codes, which can be executed in a computer using an interpreter, as well as machine codes made by a compiler. The aforementioned hardware device may be configured to operate as one or more software modules in order to perform the operations according to embodiments of the present invention, and vice versa.

The programming module according to embodiments of the present invention may include one or more of the aforementioned components or may further include other additional components, or some of the aforementioned components may be omitted. Operations executed by a module, a programming module, or other component elements according to various embodiments of the present invention may be executed sequentially, in parallel, repeatedly, or in a heuristic manner. Further, some operations may be executed according to another order or may be omitted, or other operations may be added.

According to various embodiments of the present invention, a storage medium that stores commands is provided. The commands are configured to allow one or more processors to perform one or more operations when the commands are executed by the one or more processors. The one or more operations may include an operation of deciding an input pattern for an output screen, an operation of determining a screen configuration corresponding to the input pattern, and an operation of changing an output screen by using the determined screen configuration.

A method and an apparatus for controlling an electronic device according to various embodiments of the present invention may process an object which is to be generated by an input such that the object is generated in a horizontal direction.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents

What is claimed is:

1. An electronic device comprising:
a touch screen; and
a processor configured to control to:
display a data input application screen on the touch screen,
detect a touch input on the data input application screen, wherein the touch input includes a first input for inputting an object on the data input application screen,
determine whether the touch input includes a second input, wherein the second input is different from the first input,
in response to determining that the touch input includes the second input, change at least one of an output inclination and an output magnification of at least one element included in the data input application screen based on at least one of an inclination and a size of an area at which the second input is detected, and
restore the at least one of the output inclination and the output magnification of the at least one element included in the data input application screen if the touch input is released.

2. The electronic device of claim 1, further comprising:
a memory configured to store configuration information for the data input application screen corresponding to at least one of the inclination and the size of the area at which the second input is detected, and
wherein the configuration information for the data input application comprises the at least one of the output inclination and the output magnification of the at least one element included in the data input application screen.

3. The electronic device of claim 1, wherein the processor is further configured to compare the area at which the second input is detected with a predetermined area, and if the area of the second input is at least equal to a predetermined area, change the at least one of the output inclination and the output magnification of the at least one element included in the data input application screen in response to detecting the touch input on the data input application screen.

4. The electronic device of claim 1, wherein the processor is further configured to change the at least one of the output inclination and the output magnification of the at least one element included in the data input application screen based on a shape of the area at which the second input is detected.

5. The electronic device of claim 1, wherein the touch input comprises a direct input or an indirect input made by an input means.

6. The electronic device of claim 1, wherein the processor is further configured to change the output inclination of the at least one element included in the data input application screen based on the inclination of the area at which the second input is detected.

7. The electronic device of claim 1, wherein the processor is further configured to change the output magnification of the at least one element included in the data input application screen based on the size of the area at which the second input is detected.

8. A method of inputting data of an electronic device, the method comprising:
 displaying a data input application screen on a touch screen;
 detecting a touch input on the data input application screen, wherein the touch input includes a first input for inputting an object on the data input application screen;
 determining whether the touch input includes a second input, wherein the second input is different from the first input;
 response to determining that the touch input includes the second input, changing at least one of an output inclination and an output magnification of at least one element included in the data input application screen based on at least one of an inclination and a size of an area at which the second input is detected; and
 restoring the at least one of the output inclination and the output magnification of the at least one element included in the data input application screen if the touch input is released.

9. The method of claim 8, wherein changing the at least one of the output inclination and the output magnification of the at least one element included in the data input application screen comprises one of:
 outputting the data input application screen on a background screen;
 outputting the data input application screen by adding a layer; and
 using a region of the background screen as the data input application screen.

10. The method of claim 8, wherein changing the at least one of the output inclination and the output magnification of the at least one element included in the data input application screen comprises:
 comparing the area at which the second input is detected with a predetermined area; and
 if the area of the second input is at least equal to a predetermined area, changing the at least one of the output inclination and the output magnification of the at least one element included in the data input application screen in response to detecting the touch input on the data input application screen.

11. The method of claim 8, wherein the touch input comprises a direct input or an indirect input for the touch screen.

12. The method of claim 8, wherein changing the at least one of the output inclination and the output magnification of the at least one element included in the data input application screen comprises determining configuration information for the data input application screen corresponding to the inclination or the size of the area at which the second input is detected, and
 wherein the configuration information for the data input application comprises the at least one of the output inclination and the output magnification of the at least one element included in the data input application screen.

13. The method of claim 8, wherein changing the at least one of the output inclination and the output magnification of the at least one element included in the data input application screen comprises changing the output magnification of the at least one element included in the data input application screen based on the size of the area at which the second input is detected.

14. The method of claim 8, wherein changing the at least one of the output inclination and the output magnification of the at least one element included in the data input application screen comprises changing the output inclination of the at least one element included in the data input application screen based on the inclination of the area at which the second input is detected.

15. A non-transitory computer readable recording medium having recorded thereon a program for executing operations of:
 displaying a data input application screen on a touch screen;
 detecting a touch input on the data input application screen, wherein the touch input includes a first input for inputting an object on the data input application screen;
 determining whether the touch input includes a second input, wherein the second input is different from the first input,
 in response to determining that the touch input includes the second input, changing at least one of an output inclination and an output magnification of at least one element included in the data input application screen based on at least one of an inclination and a size of an area at which the second input is detected; and
 restoring the at least one of the output inclination and the output magnification of the at least one element included in the data input application screen if the touch input is released.

* * * * *